US011748710B2

(12) United States Patent
Chuang et al.

(10) Patent No.: US 11,748,710 B2
(45) Date of Patent: Sep. 5, 2023

(54) SYSTEM AND METHOD FOR MANAGING A TALENT PLATFORM

(71) Applicant: Scout Exchange LLC, Boston, MA (US)

(72) Inventors: John H. Chuang, Brookline, MA (US); David Daganhardt, Mansfield, MA (US)

(73) Assignee: Scout Exchange LLC, Boston, MA (US)

( * ) Notice: Subject to any disclaimer, the term of this patent is extended or adjusted under 35 U.S.C. 154(b) by 1015 days.

(21) Appl. No.: 16/208,198

(22) Filed: Dec. 3, 2018

(65) Prior Publication Data

US 2019/0244176 A1  Aug. 8, 2019

Related U.S. Application Data

(63) Continuation of application No. 13/645,899, filed on Oct. 5, 2012, now Pat. No. 10,147,072.

(Continued)

(51) Int. Cl.
*G06Q 10/1053* (2023.01)
*G06Q 10/0631* (2023.01)

(52) U.S. Cl.
CPC . *G06Q 10/1053* (2013.01); *G06Q 10/063112* (2013.01)

(58) Field of Classification Search
CPC combination set(s) only.
See application file for complete search history.

(56) References Cited

U.S. PATENT DOCUMENTS 7,509,672 B1 3/2009 Horwitz et al.
7,783,541 B1 8/2010 Rolf
(Continued)

FOREIGN PATENT DOCUMENTS

CA 2 657 495 A1 9/2009
EP 3 163 525 A1 5/2017
(Continued)

OTHER PUBLICATIONS

G. H. L. Luk, D. K. W. Chiu and H. Leung, "Web-service Based Human Resource Recruitment by Using Matchmaking Decision Support," 2006, pp. 67-67, Retrieved from internet: https://ieeexplore.ieee.org/document/4031326?source=IQplus (Year: 2006).*

(Continued)

*Primary Examiner* — Lynda Jasmin
*Assistant Examiner* — Ehrin L Pratt
(74) *Attorney, Agent, or Firm* — Wolf, Greenfield & Sacks, P.C.

(57) ABSTRACT

Improved systems and methods of facilitating placement of candidates between employers and recruiters are provided. In various implementations, such systems and methods provide an integrated interface within the ATS platform for employers and integrated interface within the talent platforms for recruiters. In another implementation, a talent platform exchange is provided that permits disparate talent platforms to communicate and thus more effectively manage the hiring process from within the platform. To this end, interfaces and other components may be provided which facilitate communication between talent platforms and a talent platform exchange. Such communication capability would enable a direct hire marketplace where employers engage recruiters to fill positions through their presently implemented ATSs.

20 Claims, 17 Drawing Sheets

Related U.S. Application Data

(60) Provisional application No. 61/543,609, filed on Oct. 5, 2011.

(56) References Cited

U.S. PATENT DOCUMENTS

| | | |
|---|---|---|
| 8,103,679 B1 | 1/2012 | Cranfill et al. |
| 10,147,072 B2 | 12/2018 | Chuang et al. |
| 10,664,775 B2 | 5/2020 | Chuang et al. |
| 2002/0010614 A1 | 1/2002 | Arrowood |
| 2003/0037032 A1 | 2/2003 | Neece et al. |
| 2004/0230452 A1 | 11/2004 | Abe et al. |
| 2004/0267595 A1 | 12/2004 | Woodings et al. |
| 2005/0267793 A1 | 12/2005 | Campbell et al. |
| 2007/0021982 A1 | 1/2007 | Sun |
| 2007/0033064 A1 | 2/2007 | Abrahamsohn |
| 2007/0094109 A1 | 4/2007 | Perry |
| 2007/0288308 A1* | 12/2007 | Chen ............... G06Q 30/0254 705/14.52 |
| 2008/0027783 A1 | 1/2008 | Hughes et al. |
| 2008/0059523 A1 | 3/2008 | Schmidt et al. |
| 2008/0065441 A1 | 3/2008 | Langmack et al. |
| 2009/0083235 A1 | 3/2009 | Joao |
| 2009/0089124 A1 | 4/2009 | Henderson et al. |
| 2009/0094239 A1 | 4/2009 | Sabol et al. |
| 2009/0125353 A1 | 5/2009 | Bullock et al. |
| 2009/0125443 A1 | 5/2009 | Lappin et al. |
| 2009/0177518 A1 | 7/2009 | Adams et al. |
| 2009/0216680 A1 | 8/2009 | McCown et al. |
| 2009/0299829 A1 | 12/2009 | Fraser et al. |
| 2010/0030595 A1 | 2/2010 | Day |
| 2010/0169143 A1 | 7/2010 | Carr et al. |
| 2010/0185551 A1 | 7/2010 | Ganesh et al. |
| 2010/0211516 A1 | 8/2010 | Andrekovich et al. |
| 2011/0137816 A1 | 6/2011 | Kornblum et al. |
| 2011/0208664 A1 | 8/2011 | Rahman |
| 2011/0276506 A1* | 11/2011 | Schmitt ............... G06Q 30/0241 705/321 |
| 2011/0276631 A1* | 11/2011 | Schmitt ............... G06Q 10/1053 709/205 |
| 2012/0109837 A1 | 5/2012 | Sahagun et al. |
| 2012/0185402 A1 | 7/2012 | Lajoie |
| 2012/0215578 A1 | 8/2012 | Swierz, III et al. |
| 2012/0239585 A1 | 9/2012 | Bailey |
| 2013/0013443 A1* | 1/2013 | Christie ............... G06Q 10/06 705/26.4 |
| 2013/0036065 A1 | 2/2013 | Chen et al. |
| 2013/0036066 A1 | 2/2013 | Telahun |
| 2013/0046704 A1 | 2/2013 | Patwa et al. |
| 2013/0166465 A1 | 6/2013 | Barros et al. |
| 2013/0262175 A1 | 10/2013 | Deshpande et al. |
| 2013/0275193 A1 | 10/2013 | Chuang |
| 2013/0275321 A1 | 10/2013 | Chuang |
| 2013/0275322 A1 | 10/2013 | Chuang |
| 2013/0275323 A1 | 10/2013 | Chuang |
| 2013/0282605 A1* | 10/2013 | Noelting ............... G06Q 10/10 705/321 |
| 2014/0188768 A1 | 7/2014 | Bonissone et al. |
| 2014/0244333 A1 | 8/2014 | Bournas |
| 2014/0337242 A1 | 11/2014 | Bailey et al. |
| 2015/0112765 A1 | 4/2015 | Sundaresh et al. |
| 2015/0242781 A1 | 8/2015 | Mancuso et al. |
| 2015/0317602 A1 | 11/2015 | Rao et al. |
| 2016/0140528 A1 | 5/2016 | Shaaban et al. |
| 2017/0024410 A1 | 1/2017 | Pola |
| 2017/0069036 A1 | 3/2017 | Shaaban et al. |
| 2017/0109834 A1 | 4/2017 | Shaaban et al. |
| 2017/0243152 A1 | 8/2017 | Thomson et al. |
| 2017/0357943 A1 | 12/2017 | Tiner et al. |
| 2017/0357945 A1 | 12/2017 | Ashkenazi et al. |
| 2018/0232683 A1 | 8/2018 | Chuang et al. |
| 2018/0232684 A1 | 8/2018 | Chuang et al. |
| 2018/0232703 A1 | 8/2018 | Chuang et al. |
| 2019/0220748 A1 | 7/2019 | Denil et al. |
| 2020/0104800 A1 | 4/2020 | Oliynyk et al. |
| 2020/0226532 A1 | 7/2020 | Lazarus et al. |
| 2021/0103875 A1 | 4/2021 | Chuang et al. |

FOREIGN PATENT DOCUMENTS

| | | |
|---|---|---|
| JP | 2002-024459 A | 1/2002 |
| JP | 2002-288325 A | 10/2002 |
| JP | 2004-192224 A | 7/2004 |
| JP | 2005-222168 A | 8/2005 |
| JP | 2005-275991 A | 10/2005 |
| JP | 2006-185409 A | 7/2006 |
| JP | 2009-075690 A | 4/2009 |
| JP | 2011-517354 A | 6/2011 |
| JP | 2015-501024 A | 1/2015 |
| WO | WO 01/09772 A1 | 2/2001 |
| WO | WO 02/46884 A2 | 6/2002 |
| WO | WO 2006/132759 A2 | 12/2006 |
| WO | WO 2008/121171 A1 | 10/2008 |
| WO | WO 2009/108445 A | 9/2009 |
| WO | WO 2013/052769 A1 | 4/2013 |

OTHER PUBLICATIONS

Extended Euorpean Search Report dated Jul. 9, 2020 in connection with European Application No. 20159615.2.
European Communication dated Oct. 14, 2020 in connection with European Application No. 18707550.2.
Invitation to Pay Additional Fees mailed Dec. 3, 2019 in connection with International Application No. PCT/US2019/053626.
International Search Report and Written Opinion dated Jan. 31, 2020 in connection with International Application No. PCT/US2019/053626.
International Search Report and Written Opinion dated Mar. 4, 2020 in connection with International Application No. PCT/US2019/065674.
International Preliminary Report on Patentability dated Apr. 8, 2021 in connection with International Application No. PCT/US2019/053626.
Zwilling, 10 Questions for Selecting a Recruiter to Attract the Best Talent to Your Business Team. Sep. 11, 2011 https://www.inc.com/martin-zwilling/how-to-find-best-hire-for-that-key-role-in-your-new-venture.html. p. 1-6.
U.S. Appl. No. 13/645,759, filed Oct. 5, 2012, Chuang.
U.S. Appl. No. 13/645,878, filed Oct. 5, 2012, Chuang.
PCT/US2012/058904, Dec. 6, 2012, Invitation to Pay Additional Fees.
PCT/US2012/058904, Feb. 8, 2013, International Search Report and Written Opinion.
PCT/US2012/058904, Apr. 17, 2014, International Preliminary Report on Patentability.
PCT/US2018/018028, Apr. 25, 2018, International Search Report and Written Opinion.
EP 12838881.6, Mar. 5, 2015, Extended European Search Report.
EP 201596615.2, Jul. 9, 2020, Extended European Search Report.
EP 18707550.2, Oct. 14, 2020, European Communication Report.
Invitation to Pay Additional Fees from corresponding International Application No. PCT/US2012/058904 mailed Dec. 6, 2012.
International Search Report and Written Opinion from corresponding International Application No. PCT/US2012/058904 dated Feb. 8, 2013.
International Preliminary Report on Patentability from corresponding International Application No. PCT/US2012/058904 dated Apr. 17, 2014.
International Search Report and Written Opinion dated Apr. 25, 2018 in connection with International Application No. PCT/US2018/018028.
Extended European Search Report from corresponding European Application No. EP 12838881.6 dated Mar. 5, 2015.
Collins, Best practices for avoiding duplicate candidate submissions to job orders by recruiters? Jul. 2007 [retrieved Jan. 23, 2013] retrieved from the Internet <URL: http://www.linkedin.com/answers/hiring-human-resources/staffing-recruiting/HRH_SFF/62429-1275612>.

(56) References Cited

OTHER PUBLICATIONS

Cullens, Fishing where the fish are. National Apartment Associate, Nov. 2006.
Singh et al., Prospect: A System for Screening Candidates for Recruitment. CIKM '10. Oct. 26-30, 2010:659-668.
Summons to Attend Oral Proceedings dated Aug. 2, 2019 in connection with European Application No. EP 12838881.6.
U.S. Appl. No. 16/586,797, filed Sep. 27, 2019, Oliynyk et al.
U.S. Appl. No. 16/710,917, filed Dec. 11, 2019, Lazarus et al.
PCT/US2019/053626, Dec. 3, 2019, Invitation to Pay Additional Fees.
PCT/US2019/053626, Jan. 31, 2020, International Search Report and Written Opinion.
PCT/US2019/065674, Mar. 4, 2020, International Search Report and Written Opinion.
PCT/US2019/053626, Apr. 8, 2021, International Preliminary Report on Patentability.
International Preliminary Report on Patentability dated Jun. 24, 2021 in connection with International Application No. PCT/US2019/065674.
EP 12838881.6, Aug. 2, 2019, Summons to Attend Oral Proceedings.

\* cited by examiner

FIG. 4

XpressHire

Req. Hunter | Performance Metrics | Accounting | Terms & Conditions | FAQs

Performance Metrics

Date Range
(from) [mm/dd/yy] 📅 (to) [mm/dd/yy] 📅

[ Go ]

Statistics

| | Cumulative | Conversion % |
|---|---|---|
| # Submittals | 10 | |
| # Approved | 5 | 50% |
| # Placements | 1 | 10% |

Current XpressHire Rating

⭐⭐⭐⭐☆

Detail

| ▸ Date Posted | ▸ Industry | ▸ Title | ▸ Skills | ▸ Location | ▸ Company | ▸ Salary | ▸ Fee |
|---|---|---|---|---|---|---|---|
| | | | | | | | |

[ Exit ]

XpressHire

Dear John,

Great news - the employer listed below has expressed interest in your candidate!

XpressHire has provided the employer with the candidate name as well as your name and contact information. Please contact the employer at your earliest convenience to schedule an interview for your candidate.

The employer is aware that if the candidate is hired within 6 mnths of todays date, then the employer is obligated to pay you the placement fee.

Thank you,
XpressHire Team

| | |
|---|---|
| Candidate Name: | Catherine Middleton |
| Employer: | Turbine Inc. |
| Contact: | Susan Eggenberger |
| Address: | 333 W.State Street, Boston Ma 02134 |
| Phone: | (617) 555-1653 |
| Email: | seggenberger@turbine.net |
| Req Title: | Business Administration |
| Reg ID# | S43329 |

≡XpressHire

Candidates by Req.

| Req. ID# ▽ | Req. Title ▽ | Req. Location ▽ | # New Candidates ▽ | Total Candidates ▽ | Remove Position |
|---|---|---|---|---|---|
| A742302 | Program Manager | Boston | 10 | 20 | 🗑 |
| A941605 | CIO | Toronto | 4 | 8 | 🗑 |
| B146391 | Software Engineer | Newton | 5 | 5 | 🗑 |
| C762884 | Web Developer | Boston | 8 | 16 | 🗑 |
| C439291 | C# Programmer | Boston | 18 | 45 | 🗑 |

Exit

*FIG. 14*

≡XpressHire

Req. Information

| Req. ID: | B146391 |
|---|---|
| Req. Title: | Software Engineer |
| Req. Location: | Newton, MA |

Candidate List

| Candidate ID# ▽ | Recruiter Company: ▽ | Recruiter Name: ▽ | Recruiter Rating: ▽ | Candidate Status: ▽ | Remove Candidate |
|---|---|---|---|---|---|
| A742302 | | | ☆☆☆☆☆ | | |
| A941605 | Turbo Staffing | Jake Understow | ★★★★☆ | Waiting | 🗑 |
| B146391 | | | ★★★☆☆ | Interested | 🗑 |
| C762884 | | | ☆☆☆☆☆ | Waiting | 🗑 |
| C439291 | Aquent | Thomas Baine | ★☆☆☆☆ | Interested | 🗑 |

Exit

*FIG. 15* even with a high unemployment rate many companies are having trouble filling open positions because of an increasing disparity between critical and non-critical skills talent. The U.S. job market is migrating to a highly specialized labor force with a focus toward critical or specialized skills talent. It is projected that jobs for highly skilled talent will continue to increase, while only about half of the available highly skilled talent will qualify for those jobs. These dynamics result in an enormous
SYSTEM AND METHOD FOR MANAGING A TALENT PLATFORM

RELATED APPLICATIONS

This Application is a Continuation of U.S. application Ser. No. 13/645,899, filed Oct. 5, 2012, entitled "SYSTEM AND METHOD FOR MANAGING A TALENT PLATFORM", which is a Non-Provisional of Provisional (35 USC 119(e)) of U.S. Application Ser. No. 61/543,609, filed Oct. 5, 2011, entitled "SYSTEM AND METHOD FOR MANAGING A TALENT PLATFORM EXCHANGE", both of which are herein incorporated by reference in its entirety.

BACKGROUND

Aspects of the present invention disclosed herein relate generally to systems and methods for managing recruitment and hiring efforts and more particularly to apparatus and processes for managing and facilitating the placement of candidates between employers and recruiters.

DISCUSSION OF RELATED ART

Often, companies seeking to fill job openings use employing systems referred to in the art as Applicant Tracking Systems (ATS), commercially available from ATS companies (e.g., the BrassRing talent platform available from Kenexa, Wayne, Pa., the Bullhorn ATS available from Bullhorn, Boston, Mass.). Such ATSs handle job applications and manage resume data from a number of candidates. These ATSs also provide a central location and database for a company's recruitment efforts (e.g., perform "talent management" functions). Typically, ATSs are built to better assist management of resumes and applicant information by collecting candidate inputted data from the company website, extracting candidate data from applicants on company used job boards or sourcing data from the company's own database of past candidates. ATS companies may also provide an assortment of value-added recruiting and sourcing services to employers looking for quality candidates. Some services offered by the ATS companies may include employment branding, candidate tracking and on-boarding.

Companies seeking to fill job requisitions may also look outside the ATS to other resources such as professional recruiters, employment agencies, recruitment websites, job search engines and social media to find qualified candidates to fill open requisitions or job orders. Professional recruiters or employment agencies work to match company open positions with the agencies' candidate pool on a contingency fee basis. A contingency or placement fee is usually paid by the company when the matched candidate accepts the position.

SUMMARY

It is appreciated that United States unemployment rate continues to be high. However, even with a high unemployment rate many companies are having trouble filling open positions because of an increasing disparity between critical and non-critical skills talent. The U.S. job market is migrating to a highly specialized labor force with a focus toward critical or specialized skills talent. It is projected that jobs for highly skilled talent will continue to increase, while only about half of the available highly skilled talent will qualify for those jobs. These dynamics result in an enormous amount of unqualified applicants applying to open high skilled positions and increasing the company's internal recruitment labor costs.

According to one aspect of the present invention, typical recruitment and hiring practices used by companies and organizations are extremely inefficient at placing the most qualified candidates to open positions. Generally, these hiring methods may only provide approximately 14% likelihood of a successful hiring decision. Poor recruitment practices may further lead to high staff turnover, as employees may be mismatched to their position and may leave as a result of poor performance or unhappiness. High turnover may further result in even higher recruitment costs; as those employees leave additional recruitment efforts may need to be undertaken. Depending upon the employee's position, the costs of employee turnover can be staggering, ranging anywhere from half to five times an employee's annual wages.

According to one aspect of the present invention, it is appreciated that companies seeking to facilitate and manage recruitment and hiring efforts rely on ATS systems (e.g., talent management platforms) described above. However, these ATS systems are non-optimal and do not adequately manage the hiring process. Talent management platform systems (hereinafter "talent platforms") used by staffing firms, recruiters and employers do not communicate with each other, and therefore, users of such platforms must go outside of such systems to find suitable candidates. Because users of talent platform frequently operate outside of the talent platforms to perform various hiring functions, the overall hiring functions cannot be effectively managed or evaluated. It is further appreciated that these ATS systems do not provide the functions necessary to filter through the number of unqualified applicants, causing the employers with open positions to rely on specialized staffing firms to decrease the time-to-fill and cost per hire.

According to another aspect of the present invention, it is appreciated that when companies go outside of their ATSs to engage recruiters and facilitate placement of candidate, the ATS companies are removed from the recruitment activity. Accordingly, the ATS companies miss the opportunity to monetize the $12B contingency direct hire placement market. In addition, staffing agencies typically work with only a select number of clients and have a limited number of requisitions or job orders available to them. Furthermore, staffing companies compete against each other for placing candidates, often duplicating submissions (i.e. multiple recruiters submitting the same candidate more than once for the same job opening).

Accordingly, there is a need for improved systems and methods of facilitating placement of candidates between employers and recruiters. Such systems and methods provide an integrated interface within the ATS platform for employers and integrated interface within the talent platforms for recruiters. According to one aspect of the present invention, a talent platform exchange is provided that permits disparate talent platforms to communicate and thus more effectively manage the hiring process from within the platform. To this end, interfaces and other components may be provided which facilitate communication between talent platforms and a talent platform exchange. Such communication capability would enable a direct hire marketplace where employers engage recruiters to fill positions through their presently implemented ATSs.

Aspects and examples disclosed herein are further directed to staffing talent platforms and hiring talent platforms which allow the talent platform exchange to distribute open job requisitions from employers to recruiters, channel qualified candidate submittals from recruiters to employers, track placement activity and manage invoices, and further manage collections and distribution of payments. The talent platform exchange system provides the systems and processes to facilitate the placement of candidates to open job orders within interfaces familiar to staffing and hiring parties.

According to another aspect of the present invention, it is appreciated that a distributed system that manages the placement process with all available candidates and available jobs is beneficial for the candidates, recruiters, staffing personnel in companies and talent platform providers. For instance, because candidate information is shared among multiple talent platforms, exposure of a particular candidate is increased and is more likely to be matched with a particular job order. For employers, the number of candidates that can be located and vetted is increased, thereby increasing the likelihood that a placement is made in less time, decreasing recruitment costs and increasing revenue as a result. For companies and their staffing personnel, they are able to find qualified candidates, as well as perform and manage placement functions though a single platform.

For talent platform providers, their functionally is increased and these talent platforms are relied upon to perform more aspects of the hiring transactions. Also, as outlined further below, talent platform providers may be paid a portion of the placement fee, incorporating them into a market they are typically excluded from and thus increasing the revenue for the use of such platforms.

For agencies (i.e., recruiters), access to new clients can be increased, thereby increasing the quality of provided open job orders. Increased quantity of job orders can allow agencies to target specific job markets matching the agency's exciting pool of candidates. Also, job orders provided include an abundance of information and selling points, further allowing the agency to communicate directly with the employer. Consistent access to targeted job orders may further reduce sales and marketing expenses, leaving the agency to focus on quality recruiting and increasing quality placements. Easy, real-time access through existing platforms may further simplify the agency experience.

In yet another aspect, the talent exchange provides search and matching capabilities to most effectively match candidates to job orders. For agencies, they are provided tools to more effectively locate job orders to be fill and prioritize those job orders that should be worked on (e.g. by placement, probability, geography, fee, etc). For staffing personnel, functionality may be provided that filters, for a particular job order, the available pool of candidates to find an optimal quantity of candidates that are of optimal quality.

In yet another aspect, the talent exchange provides other offering typically associated with ATS platforms such as employee branding, succession planning, candidate assessment and learning management. Further, for the placement firm, tools may be provided to measure and manage the performance of agency personnel (e.g., recruiters). For instance, recruiters may be evaluated based on what types of job orders they fill (e.g., by industry, location, etc.) so that placement firms may position recruiters to maximize firm profit.

According to one aspect of the present invention, a computer system is provided for managing and enabling recruiting and sourcing activities. The computer system comprises a memory storing a plurality of data points, including at least one of a plurality of job orders from a plurality of hiring talent platforms and a plurality of candidates from a plurality of staffing talent platforms, at least one processor coupled to the memory, a hiring application interface executed by the at least one processor and configured to receive, from at least one hiring talent platform, at least one job order, the plurality of hiring talent platforms including a first hiring talent platform and a second hiring talent platform, a talent platform exchange engine executed by the at least one processor and configured to aggregate the plurality of data points, producing a summary data point wherein the summary data point is stored in the memory, and a staffing application interface executed by the at least one processor and configured to receive, from at least one staffing talent platform, requests to store at least one candidate associated with at least one job order, the plurality of staffing talent platforms including a first staffing talent platform and a second staffing talent platform.

According to one embodiment of the present invention, a first job order is received from the first hiring talent platform and a second job order is received from the second hiring talent platform, wherein the first and the second hiring platforms are different. According to another embodiment, a first candidate is received from the first staffing talent platform and a second candidate is received from the second staffing talent platform, wherein the first and the second staffing platforms are different. According to another embodiment, a talent platform exchange interface is integrated into the plurality of hiring talent platforms and the plurality of staffing party platforms. According to another embodiment, the plurality of job orders are posted to the plurality of hiring talent platforms by a plurality of hiring parties and wherein the plurality of candidates are submitted to the plurality of job orders by a plurality of hiring parties via the plurality of staffing talent platforms.

According to another embodiment, the summary data point is produced from at least one of job order information associated with the plurality of job orders, candidate information, hiring party information associated with the plurality of hiring parties and staffing party information associated with the plurality of staffing parties. According to another embodiment, the summary data point is transmitted to at least one of the plurality of hiring talent platforms and the plurality of staffing talent platforms.

According to another embodiment, the summary data point is displayed to at least one of the plurality of hiring parties via the plurality of hiring talent platforms and the plurality of staffing parties via the plurality of staffing talent platforms. According to another embodiment, the summary data point is a recruiter rating produced from at least one of staffing party information associated with the plurality of staffing parties. According to another embodiment, the system further comprises a component configured to retrieve a plurality of job orders from a plurality of job sources.

According to another aspect of the present invention, a computer implemented method is provided for managing and enabling recruiting and sourcing activities. The method comprises acts of receiving, by a computer, a plurality of job orders from a plurality of hiring talent platforms, storing, by the computer, the plurality of job orders in memory, processing the plurality of job orders to conceal information associated with at least one of the plurality of job orders and the plurality of hiring talent platforms, transmitting, by the computer, the plurality of job orders to the plurality of staffing talent platforms, receiving, by the computer, a plurality of candidates associated with the job orders from the plurality of staffing talent platforms, storing, by the computer, the plurality of candidates in the memory, transmitting, by the computer, the plurality of candidates to the plurality of hiring talent platforms, and receiving a placement fee from at least one hiring party for placement of at least one candidate.

According to one embodiment of the present invention, the method further comprises acts of receiving a first job order from the first hiring talent platform, and receiving a second job order from the second hiring talent platform. According to one embodiment of the present invention, the method further comprises acts of receiving a first candidate from the first staffing talent platform and receiving a second candidate from the second staffing talent platform.

According to one embodiment of the present invention, the method further comprises acts of posting the plurality of job orders to the plurality of hiring talent platforms by a plurality of hiring parties and submitting the plurality of candidates to the plurality of job orders by a plurality of hiring parties via the plurality of staffing talent platforms. According to another embodiment of the present invention, the method further comprises acts of an act of producing a summary data point from at least one of job order information associated with the plurality of job orders, candidate information, hiring party information associated with the plurality of hiring parties and staffing party information associated with the plurality of staffing parties.

According to another embodiment of the present invention, the act of producing the summary data point further comprises an act of producing a recruiter rating from at least one of staffing party information associated with the plurality of staffing parties. According to another embodiment of the present invention, the method further comprises an act of retrieving, by the computer, a plurality of job orders from a plurality of job sources.

According to another embodiment of the present invention, the act of receiving the placement fee further comprises an act of receiving the placement fee of a predetermined percentage of a salary of the at least one candidate. According to another embodiment of the present invention, the method further comprises acts of distributing a first percentage of the placement fee to at least one staffing party, distributing a second percentage of the placement fee to at least one hiring talent platform, distributing a third percentage of the placement fee to at least one staffing talent platform, and distributing a fourth percentage of the placement fee to the talent platform exchange engine.

According to another aspect of the present invention, a non-transitory computer readable medium having stored thereon sequences of instruction for managing and enabling recruiting and sourcing activities is provided. In one embodiment, the medium includes instructions that causes at least one processor to receive a plurality of job orders from a plurality of hiring talent platforms, store the plurality of job orders in memory, process the plurality of job orders to conceal information associated with at least one of the plurality of job orders and the plurality of hiring talent platforms, transmit the plurality of job orders to the plurality of staffing talent platforms, receive a plurality of candidates associated with the job orders from the plurality of staffing talent platforms, store the plurality of candidates in the memory, transmit the plurality of candidates to the plurality of hiring talent platforms, and receive a placement fee from at least one hiring party for placement of at least one candidate.

According to another aspect of the present invention, a computer implemented method for managing and enabling recruiting and sourcing activities is provided. The method comprises acts of receiving a plurality of job orders, storing, by the computer system, the plurality of job orders in a memory of the computer system, transmitting, by the computer system, the plurality of job orders to one or more computer systems, receiving, by the computer system, a plurality of candidates associated with the plurality of job orders, storing, by the computer, the plurality of candidates in the memory, tracking, by the computer, a placement of at least one candidate to at least one of the plurality of job orders, and processing a receipt of a placement fee from at least one hiring party for the placement of the at least one candidate.

According to one embodiment, the act of processing the receipt of the placement fee further comprises an act of receiving the placement fee of a predetermined percentage of a salary of the at least one candidate, According to another embodiment, the method further comprises an act of allocating at least a portion of the placement fee to an operator of the computer system that facilitates the placement.

According to another embodiment, the method further comprises an act of allocating at least a portion of the placement fee to a party that completes the placement of the at least one candidate. According to another embodiment, the method further comprises acts of distributing a first percentage of the placement fee to at least one staffing party, distributing a second percentage of the placement fee to at least one hiring talent platform, distributing a third percentage of the placement fee to at least one staffing talent platform, and distributing a fourth percentage of the placement fee to an operator of a talent platform exchange engine.

According to another embodiment, the method further comprises an act of determining, for at least one of the plurality of job orders, a score of at least one of the plurality of candidates in relation to the at least one job order. According to another embodiment, the method further comprises an act of determining respective scores for the plurality of candidates in relation to the at least one job order. According to another embodiment, the method further comprises an act of determining a recommended set of the plurality of candidates based on the determined respective scores for the plurality of candidates.

According to another embodiment, the method further comprises an act of facilitating, by the computer system, a communication between a plurality of parties to negotiate the placement fee. According to another embodiment, the method further comprises an act of indicating, for at least one of the plurality of job orders, that the at least one job order is out for bid.

According to another aspect of the present invention, a computer system is provided for managing and enabling recruiting and sourcing activities. The computer system comprises a memory storing a plurality of job orders, at least one processor coupled to the memory, an interface coupled to the at least one processor, the interface being adapted to transmit the plurality of job orders to one or more computer systems, and wherein the interface is adapted to receive a plurality of candidates associated with the plurality of job orders, wherein the memory is further adapted to store the plurality of candidates in the memory, wherein the processor is adapted to track a placement of at least one candidate to at least one of the plurality of job orders, and wherein the processor is adapted to process a receipt of a placement fee from at least one hiring party for the placement of the at least one candidate.

According to one embodiment of the present invention, the processor is adapted to process the placement tee of a predetermined percentage of a salary of the at least one candidate. According to another embodiment, the processor is adapted to allocate at least a portion of the placement fee to an operator of the computer system that facilitates the placement.

According to another embodiment, the processor is adapted to allocate at least a portion of the placement fee to a party that completes the placement of the at least one candidate. According to another embodiment, the processor is adapted to distribute a first percentage of the placement fee to at least one staffing party, is adapted to distribute a second percentage of the placement fee to at least one hiring talent platform, is adapted to distribute a third percentage of the placement fee to at least one staffing talent platform, and is adapted to distribute a fourth percentage of the placement fee to an operator of a talent platform exchange engine.

According to another embodiment, the processor is adapted to determine, for at least one of the plurality of job orders, a score of at least one of the plurality of candidates in relation to the at least one job order. According to another embodiment, the processor is adapted to determine respective scores for the plurality of candidates in relation to the at least one job order.

According to another embodiment, the processor is adapted to determine a recommended set of the plurality of candidates based on the determined respective scores for the plurality of candidates. According to another embodiment, the processor is adapted to facilitate a communication between a plurality of parties to negotiate the placement fee. According to another embodiment, the processor indicates, for at least one of the plurality of job orders, that the at least one job order is out for bid.

According to another aspect of the present invention, a computer implemented method is provided for managing and enabling recruiting and sourcing activities in a distributed computer system. The method comprises acts of receiving a plurality of job orders, storing, by the computer system, the plurality of job orders in a memory of the computer system, transmitting, by the computer system, the plurality of job orders to one or more computer systems, receiving, by the computer system, a plurality of candidates associated with the plurality of job orders, storing, by the computer, the plurality of candidates in the memory, and determining, by the computer for at least one of the plurality of job orders, a score of at least one of the plurality of candidates in relation to the at least one job order.

According to one embodiment of the present invention, the method further comprises an act of determining respective scores for the plurality of candidates in relation to the at least one job order. According to one embodiment of the present invention, the method further comprises an act of determining a recommended set of the plurality of candidates based on the determined respective scores for the plurality of candidates.

According to one embodiment of the present invention, the method further comprises an act of filtering the plurality of candidates to determine a optimal number and quality of candidates. According to one embodiment of the present invention, the method further comprises an act of filtering the plurality of candidates based at least in part on their respective scores for the plurality of candidates in relation to the at least one job order.

According to one embodiment of the present invention, the plurality of job orders are received from one or more independent entities including hiring talent platforms, job boards, job banks, social media, and career sites. According to one embodiment of the present invention, the method further comprises an act of directing one or more of the plurality of job orders to a staffing party based on a performance of the staffing party.

According to one embodiment of the present invention, the method further comprises an act of directing the one or more of the plurality of job orders to the staffing party based on a determined capability of the staffing party to fulfill the one or more of the plurality of job orders. According to one embodiment of the present invention, the method further comprises an act of determining a performance rating for at least one staffing party based at least in part on their historical performance of placement of the plurality of job orders. According to one embodiment of the present invention, the method further comprises an act of determining the performance rating in relation to other users within the distributed computer system.

According to another aspect of the present invention, a computer system is provided for managing and enabling recruiting and sourcing activities. The computer system comprises an interface adapted to receive a plurality of job orders, the interface being adapted to transmit the plurality of job orders to one or more computer systems, the interface being further adapted to receive a plurality of candidates associated with the plurality of job orders, a memory adapted to store the plurality of job orders and the plurality of candidates, and a processor adapted to determine for at least one of the plurality of job orders, a score of at least one of the plurality of candidates in relation to the at least one job order.

According to one embodiment, the processor is adapted to determine respective scores for the plurality of candidates in relation to the at least one job order. According to another embodiment, the processor is adapted to determine a recommended set of the plurality of candidates based on the determined respective scores for the plurality of candidates. According to another embodiment, the processor is adapted to filter the plurality of candidates to determine an optimal number and quality of candidates.

According to another embodiment, the processor is adapted to filter the plurality of candidates based at least in part on their respective scores for the plurality of candidates in relation to the at least one job order. According to another embodiment, the plurality of job orders are received from one or more independent entities including hiring talent platforms, job boards, job banks, social media, and career sites.

According to another embodiment, the processor is adapted to direct one or more of the plurality of job orders to a staffing party based on a performance of the staffing party. According to another embodiment, the processor is adapted to direct the one or more of the plurality of job orders to the staffing party based on a determined capability of the staffing party to fulfill the one or more of the plurality of job orders.

According to another embodiment, the processor is adapted to determine a performance rating for at least one staffing party based at least in part on their historical performance of placement of the plurality of job orders. According to another embodiment, the processor is adapted to determine the performance rating in relation to other users within the distributed computer system.

According to another aspect of the present invention, a computer implemented method is provided for managing and enabling recruiting and sourcing activities in a distributed computer system. The method comprises acts of receiving a plurality of job orders, storing, by the computer system, the plurality of job orders in a memory of the computer system, transmitting, by the computer system, the plurality of job orders to one or more computer systems, receiving, by the computer system, a plurality of candidates associated with the plurality of job orders, determining, for each of the plurality of candidates, whether a duplicate candidate exists, and if so, not permitting the creation of a duplicate candidate in the memory of the computer system.

According to one embodiment of the present invention, the method further comprises an act of assigning a unique identifier to each of the plurality of candidates. According to one embodiment of the present invention, the method further comprises an act of determining at least one placement party associated with at least one of the plurality of candidates, wherein the at least one placement party assists in the placement of the at least one of the plurality of candidates.

According to one embodiment of the present invention, the method further comprises an act of allocating, to the at least one placement party, at least a portion of a placement fee associated with the placement of the at least one of the plurality of candidates. According to one embodiment of the present invention, the act of determining the at least one placement party includes an act of determining a party that submitted the at least one candidate for a particular job order of the plurality of job orders.

According to one embodiment of the present invention, the method further comprises an act of displaying to a user of the distributed computer system, detail information relating to at least one of the plurality of candidates responsive to the user assenting to conditions of placement of the at least one of the plurality of candidates. According to one embodiment of the present invention, the method further comprises an act of displaying to a user of the distributed computer system, detail information relating to at least one of the plurality of job orders responsive to the user assenting to conditions of placement of at least one of the plurality of candidates in the distributed system.

According to one embodiment of the present invention, the method further comprises an act of authenticating, to a talent platform exchange that permits access to the plurality of job orders and the plurality of candidates, said authentication being performed via a separate application without the need for a separate authentication to the talent platform exchange. According to one embodiment of the present invention, the act of determining the party further comprises and act of determining the party that first submitted the at least one candidate for a particular job order of the plurality of job orders. According to one embodiment of the present invention, the method further comprises an act of prohibiting other parties from submitting the at least one candidate for the particular job order.

According to another aspect of the present invention, a computer system is provided for managing and enabling recruiting and sourcing activities. The computer system comprises an interface adapted to receive a plurality of job orders, the interface being adapted to transmit the plurality of job orders to one or more computer systems, the interface being further adapted to receive a plurality of candidates associated with the plurality of job orders, a memory adapted to store the plurality of job orders and the plurality of candidates, a processor adapted to determine, for each of the plurality of candidates, whether a duplicate candidate exists, and if so, the processor is adapted to prohibit a creation of a duplicate candidate in the memory of the computer system.

According to one embodiment of the present invention, the processor is adapted to assign a unique identifier to each of the plurality of candidates. According to another embodiment, the processor is adapted to determine at least one placement party associated with at least one of the plurality of candidates, wherein the at least one placement party assists in the placement of the at least one of the plurality of candidates.

According to another embodiment, the processor is adapted to allocate, to the at least one placement party, at least a portion of a placement fee associated with the placement of the at least one of the plurality of candidates. According to another embodiment, the processor is adapted to determine a party that submitted the at least one candidate for a particular job order of the plurality of job orders.

According to another embodiment, the system further comprises a display adapted to display to a user of the distributed computer system, detail information relating to at least one of the plurality of candidates responsive to the user assenting to conditions of placement of the at least one of the plurality of candidates. According to another embodiment, the system further comprises a display adapted to display to a user of the distributed computer system, detail information relating to at least one of the plurality of job orders responsive to the user assenting to conditions of placement of at least one of the plurality of candidates in the distributed system.

According to another embodiment, the processor is adapted to authenticate, to a talent platform exchange that permits access to the plurality of job orders and the plurality of candidates, said authentication being performed via a separate application without the need for a separate authentication to the talent platform exchange. According to another embodiment, the processor is adapted to determine the party that first submitted the at least one candidate for a particular job order of the plurality of job orders. According to another embodiment, the processor is adapted to prohibit other parties from submitting the at least one candidate for the particular job order. Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 4 is an example illustration of a search interface within a staffing talent platform;

FIG. 5 is an example illustration of an interface for generating and displaying performance metrics within the staffing talent platform;

FIG. 6 is an example illustration of an interface for generating and displaying accounting information within the staffing talent platform;

FIG. 8 is an example of a notification transmitted to a staffing party;

FIG. 9 is an example illustration of a candidate management interface provided by the talent platform exchange;

FIG. 10 is an example illustration of a hiring talent platform provided to a hiring party;

FIG. 11 is an example illustration of an interface for generating and displaying performance metrics within a hiring talent platform;

FIG. 12 is an example illustration of an interface for generating and displaying accounting information within a hiring talent platform;

FIG. 14 is an example illustration of a candidate interface within the hiring talent platform;

FIG. 15 is an example illustration of a candidate list provided within the candidate interface within the hiring talent platform.

DETAILED DESCRIPTION

As described above, ATS companies are typically removed from the contingency direct hire placement market. While ATS companies are without access to the recruiters' pool of candidates, the recruiters do not have access to the ATS database of job requisitions. Accordingly, there is a need for a distributed recruitment system that provides integrated interfaces that directly link the recruiting services with the ATS services. Processes and systems in accord with some examples include a talent platform exchange system, a first integrated interface for the ATS services to provide direct access to the recruiter's candidate pool and a second integrated interface for the staffing services to provide direct access to the ATS database of job requisitions.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

System for Managing the Placement of Candidates

Figure 1A:
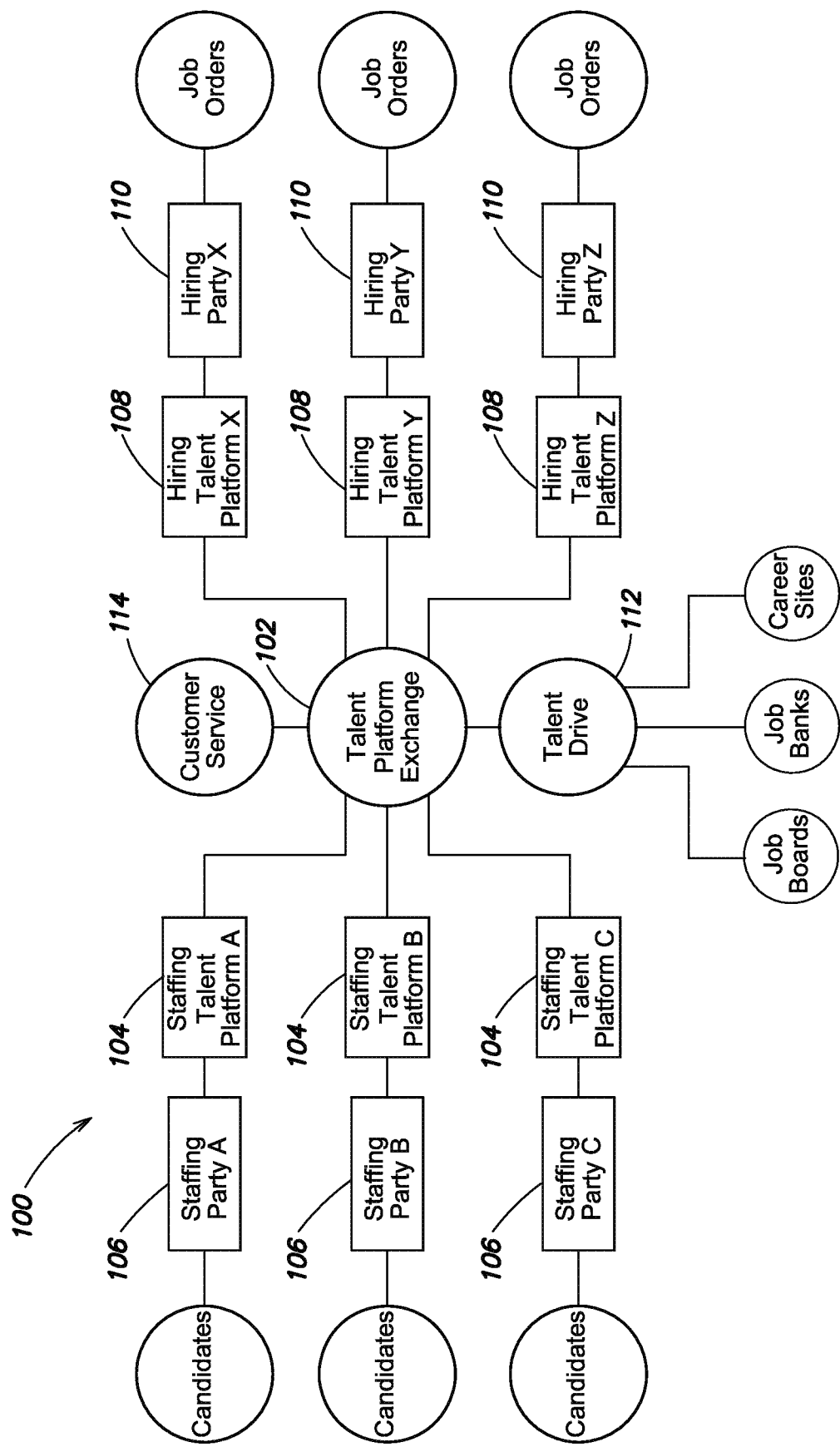
FIG. 1A is a block diagram of one example of a distributed recruitment system within a network.

FIG. 1A shows one example of a distributed system 100 for managing and enabling the placement of candidates to job orders. According to various examples, the system 100 is implemented using one or more computer systems, such as the distributed computer system 1600 discussed below with regard to FIG. 16. Thus, examples of the system 100 include a variety of hardware and software components configured to perform the functions described herein and examples are not limited to a particular hardware component, software component or a particular combination thereof.

As illustrated in FIG. 1A, the logical and physical components of the system 100 include a talent platform exchange 102, staffing talent platforms A, B and C 104 used by staffing parties A, B and C 106, and hiring talent platforms X, Y and Z 108 used by one or more hiring parties X, Y and Z 110, each of which described in further detailed below. The talent platform exchange 102 permits disparate staffing talent platforms A, B and C to communicate with disparate hiring talent platforms X, Y and Z and thus more effectively manage the hiring process from within the platform. Such communication capability enables a direct hire marketplace where employers engage recruiters to fill positions through their presently implemented ATSs.

One or more of the staffing parties 106 may be employment agencies, executive search firms, staffing agencies each including recruiting agents, or independent or freelance recruiters. The staffing party 106 may have a network of professional contacts that could become potential candidates part of the candidate pool. In turn, the hiring party 110 may be any type of corporate entity or organization or any employer seeking to fill an open position and may further include a human resources (HR) department including one or more HR employees. Hiring party 110 may open one or more job orders or requisitions (reqs.) to fill job openings.

Staffing parties A, B and C may specialize in placement of different types of candidates with different skill sets and geographical preferences. For example, staffing party A may be a freelance recruiter and may specialize in placement within the legal field specifically in the New England area. Staffing party B may be a recruiter part of an executive search firm specializing in placement of C-level candidates worldwide. Finally, staffing party C may be a staffing agency focusing on high-tech employment placement in the Silicon Valley region.

For the sake of simplicity and ease of understanding, FIG. 1A shows staffing parties A,B,C, hiring parties X,Y,Z, hiring talent platforms X,Y,Z, and staffing party platforms A,B,C. However, it is appreciated that any number of staffing parties and hiring parties may use any number of staffing talent platforms and hiring talent platforms, respectively to access the functions and aspects of the talent platform exchange 102. The talent platform exchange 102 may be implemented as a cloud-based computing platform, such as the EC2 platform, available from Amazon.com, Seattle, Wash. However, talent platform exchange may be implemented using other platforms and systems.

Figure 1B:
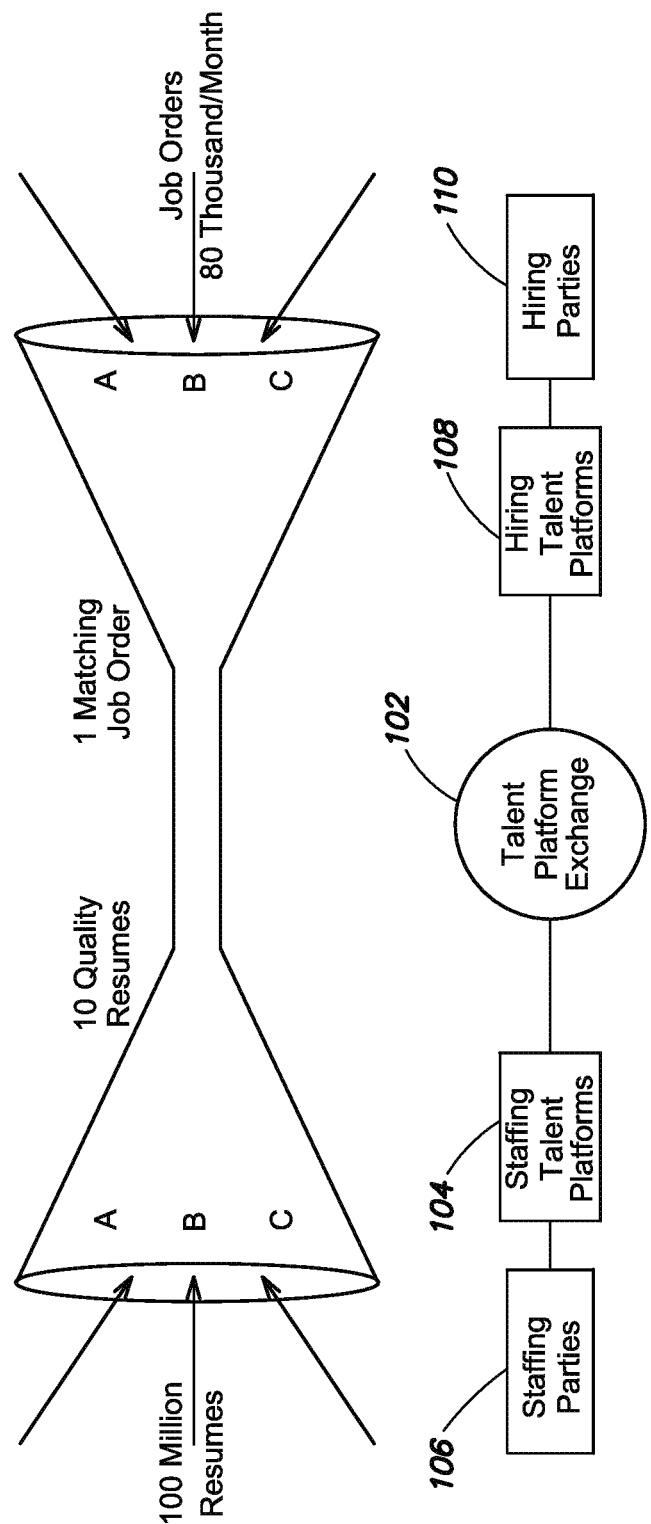
FIG. 1B is a block diagram of one example of a distributed recruitment system.

FIG. 1B shows high level aspect of talent exchange that provide search and matching capabilities to most effectively match candidates to job orders. For a staffing party 106 searching to find a job order for a particular candidate, the searching and matching functionally of the talent exchange 102 provided within the staffing talent platform 104 allows filtering of all available job orders posted by hiring parties to an optimal quantity of quality job orders matching the candidate's particular skill set. The optimal quantity of quality job orders can allow for the candidate to quickly locate the most desired job, and for the staffing party to quickly place the candidate obtaining the maximum profit.

For a hiring party 110 looking to find a particular candidate to fill a particular job order, the submission and approval functionality provided within the hiring talent platform 108 allows filtering of all the available candidates to the optimal quantity of quality candidates. According to embodiments of the present invention, hiring parties post positions to the entire staffing party community, capitalizing on recruitment bandwidth, and thus ensuring that the hiring party quickly receives optimal quality candidates. By distributing postings to the entire staffing party community, the talent platform exchange may eliminate the need for hiring parties to filter quality staffing parties based on subjective criteria, thus receiving candidates from all available sources.

As shown in the example of FIG. 1B, 100 million resumes get filtered to 10 quality resumes by the talent platform exchange 102. Similarly, 80 thousand job orders get submitted to the talent platform exchange 102 by the hiring parties every month, of which only 1 job order matches the skill set of a particular candidate.

In one example, hiring parties 110 post one or more job orders to the talent platform exchange 102 via one of the hiring party platforms 108. The talent platform exchange 102 may process the job orders and provide them to one or more staffing parties 106 via one or more staffing party platforms 104. Staffing parties 106 may match and submit a candidate to the posted job order, via the staffing party platform 104, which may be received by the talent platform exchange 102. The talent platform exchange 102 may process the submittal and provide it to the hiring party 110, via the hiring talent platform 108. The hiring party 110 reviews the submitted candidates and selects a percentage of submittals for interviews, a percentage of which may receive job offers. In one example, the hiring party 110 then agrees to pay a placement fee to the talent platform exchange, which can provide payment to the staffing party 106, and the talent platforms 104, 108 involved in the transaction.

The staffing talent platforms 104 may comprise one or more web-based staffing aggregators including ATS systems and customer relationship management (CRM) systems used by recruiters. Each web-based staffing aggregator may use different communication and storage protocols, which can be accepted and converted by the talent exchange 102, as further described below. One example of a web-based staffing aggregating solution is the Surge platform available from Sendouts Inc, St Louis, Mo. In turn, the hiring talent platforms 108 may comprise one or more ATS systems used by companies and businesses. Each ATS system may also use different communication and storage protocols, which can be accepted and converted by the talent exchange 102, as further described below. One example of an ATS system is the 2.times. BrassRing platform, available from Kenexa, Wayne, Pa.

In addition to job orders provided by the hiring party platforms 108, the talent drive 112 may receive and process job postings from various additional sources including job boards, job banks, recruitment websites, job search engines and social media, as well as other sources. Talent drive 112 may "mine" job postings from these various sources and provide them to the talent platform exchange 102. The information from the job postings may be parsed, processed, formatted and stored in the talent platform exchange 102. Various methods for accumulating or mining information from public sources may be used. The talent platform exchange 102 can display the job postings as job orders within the staffing talent platforms 104 to the staffing party 106.

To ensure smooth operation and mitigation of any technical issues, customer service 114 may intervene at any point of the candidate placement workflow, job order posting workflow or the invoicing and payment process, further described below. Customer service may further perform collection functions, if the hiring party does not pay the placement fee. Customer service may be provided by a third party system, such as Zendesk customer support system available from Zendesk.com, San Francisco, Calif. In one example, customer service communicates with all the parties involved using any available communication channels, such as email, website, community groups, Twitter, among other channels.

Figure 2:
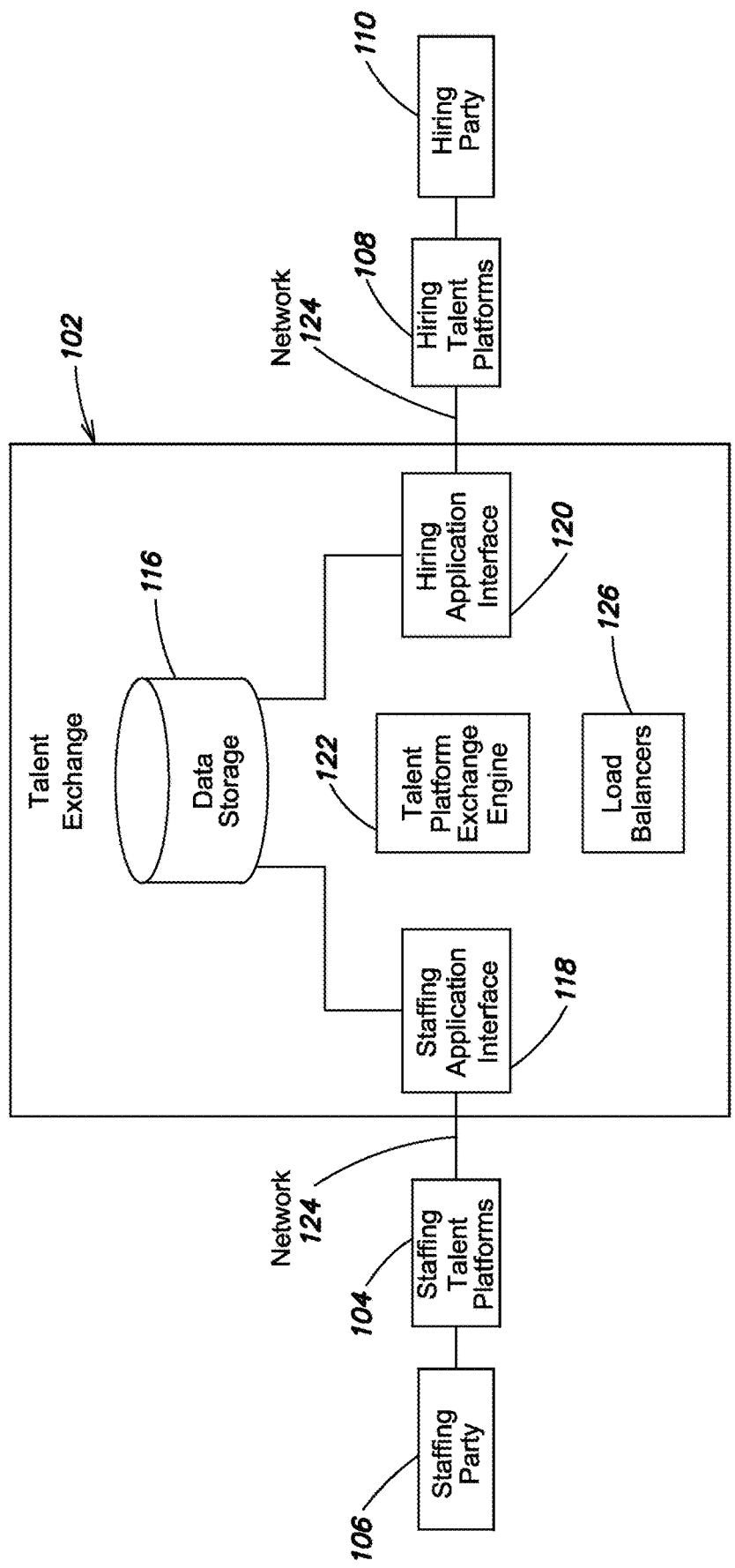
FIG. 2 is a block diagram of one example of a talent platform exchange system for centralized management of candidate placement.

The job orders created within the hiring party talent platforms 110 are received by the talent platform exchange 102 and provided to the staffing party 106 via the staffing talent platforms 104. As illustrated in FIG. 2, the staffing talent platforms 104 and hiring party talent platforms 108 are coupled to, and can exchange data with, the talent platform exchange 102 via the network 124. The network 124 may include any communication network through which computer systems may exchange (i.e. send or receive) information. For example, the network 124 may be a public network, such as the internet, and may include other public or private networks such as LANs, WANs, VAN (value added network), extranets and intranets.

The talent platform exchange 102 may include a data storage 116, a hiring application interface 120, a staffing application interface 118, a talent platform exchange engine 122, and load balancers 126. In the example shown in FIG. 2, the hiring party platforms 108 may communicate with the talent platform exchange 102 via the hiring application interface 120 and the staffing talent platforms 104 may communicate with the talent platform exchange 102 via the staffing application interface 118.

In some examples, the staffing application interface 118 and the hiring application interface 120 can be executed as an Application Programming Interface (API). API is an interface implemented by a software program to enable interaction with other software programs. APIs can provide one or more utilities and enable communication of a defined set of request messages and defines the structure of response messages. The staffing application interface 118 and the hiring application interface 120 include software logic, including the interface logic that enables the talent platform exchange 102 to interface with the talent platforms 104, 108 and the logic that drives reporting. However, as explained further below, various techniques and protocols for communicating information may be used without departing from the scope of the examples disclosed herein.

The talent platform exchange 102 may further include load balancers 126, which in one embodiment, ensure that the transaction load is evenly distributed across the application tier and also maintain secure connections (for example using hops), as well as capture volume and performance statistics for reporting purposes. The load balancers 126 may also support business continuity by enabling re-routing of transactions in the event of database or application issues.

Continuing the example of FIG. 2, the hiring application interface 120 and the staffing application interface 118 may communicate with the data storage 116. The data storage 116 depicted in FIG. 2 may include components that store and retrieve information. Some of the methods and techniques of storing and retrieving information from the data storage are described below with reference to computer system 1602 and FIG. 16. In general, the information may include any information associated with candidates provided by the staffing party 106, any information associated with job orders provided by the hiring party 110, or any information associated with the staffing and hiring parties 106, 110 themselves. For example, information may include reference information, transaction information, candidate profile information, payment information, fee information, candidate or employee tracking information, staffing party metric information, hiring party metric information, accounting information, job order information, such as full time, part-time, contract or contingent labor basis, position location, staffing party ID numbers, hiring party ID numbers, candidate ID numbers and job order ID numbers, as well as other information.

Information received at the hiring application interface 120 and the staffing application interface 118 may include data points may be stored in the data storage 116 in any logical construction capable of storing information on a computer readable medium. For example, logical structures may include, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance. One example of data storage 116 includes an instance of Amazon's Relational Database Service (RDS) which packages MySQL databases, available from Amazon.com, Seattle, Wash.

Continuing the example of FIG. 2, the talent platform exchange engine 122 communicates with the data storage 116, the hiring application interface 120 and the staffing application interface 118. Alternatively, the hiring application interface 120 and the staffing application interface 118 can communicate with the talent platform exchange engine 122, which can store the received information in the data storage 116. In another embodiment (not shown), the talent platform exchange engine 122 is executed outside of the talent platform exchange 102.

Continuing the example of FIG. 1A, communications between the hiring talent platforms 108 and the staffing talent platforms 104 may be implemented using messaging and security protocols that allow interoperability of diverse range of systems. In one example, communication messages comply with a communication protocol that is common to the talent platform exchange, the hiring talent platforms 108 and the staffing talent platforms 104. The systems described herein may employ any method of communication of business information between two electronic devices over a network without human intervention. For example, methods may include web services, cloud computing services, or any other method that allows communication of electronic business information in an interoperable, secure, and consistent manner.

For example, any protocol used may define specifications and guidelines for processing, transmitting, receiving, encrypting and structuring the communication message. In one example, the received information may include an envelope, which defines what is in the message and how to process it, a set of encoding rules for expressing instances of application-defined data types, and a convention for representing procedure calls and responses.

In one example, upon receiving information from one of the sending systems (e.g. job order information from one of the hiring talent platforms 108), the talent platform exchange 102 may validate the sending system as part of an approved network of systems. The talent platform exchange 102 can further verify that the envelope meets defined specification and that the contained information conforms to the agreed guidelines. The system may also convert the received information into any number of formats used by the receiving system (e.g. one of the staffing talent platforms 104) to store and process the contained information. In addition, security protocols can be used for communication between systems. Any number of security protocols may be used that enforce integrity and confidentiality in the communicated messages.

The talent platform exchange engine 122 may perform or more data processing activities, which can include determination of qualitative data, as described below with respect to assessment of the recruiter rating. In one example, the talent platform exchange engine 122 may determine the rating for the staffing party quantitatively, tracking the staffing party's activity and candidate placement performance. Determining the staffing party rating quantitatively may eliminate the need for hiring parties to quality staffing parties based on subjective criteria and receive candidates from all available sources.

The talent platform exchange engine 122 may perform or more aggregating and accumulation processes with information received from the hiring talent platform and the staffing party platform. The aggregation or accumulation of information may produce one or more summary data points which may be stored in the data storage 116. The summary data points (summary information) may be configured to be sent to any requesting talent platform or user of one of the talent platforms, for example in the form of performance metrics, transaction information or accounting information for reporting purposes. For example, summary data points may include hiring party information, such as total number of hiring parties (enterprise), and total number of hiring party users. Summary information may also include job order information, such as total number of job orders posted, total number of job orders active, total number of job orders active with approved candidates, total number of job orders filled, and total number of job orders closed. Summary date points may further include submittal and placement information such as, total number of submitted candidates, total number of submittals reviewed by hiring party, total number of submittals approved by the hiring party, total number of submittals rejected, total number of placements, total number of candidate starts, total number of starts satisfying guarantee period, and total number of starts not satisfying guarantee period.

In addition, summary data points may include fees and invoicing information, such as total amount of fees invoiced to hiring party, total amount of fees paid by hiring party, total amount of fees owed by hiring party, money value of each job order, dollar value of each hiring party, dollar value of each hiring party user, average placement fee for all job orders posted, average placement fee for all job orders filled, and average days to fill a job order. Summary information may also include hiring party conversion information (in terms of cumulative conversions and percentages), and may include submittals per job order, candidates approved per job order and placements per job order.

Similarly, summary data points may also include staffing party information such as the total number of staffing parties and the total number of staffing party users. Summary staffing party information may also include job order information such as the total number of job orders submitted to the talent platform exchange, the total number of submitted candidates, the total number of submittals approved by the hiring party, the total number of submittals rejected, the total number of candidate starts, the total number of starts satisfying guarantee period, and the total number of starts not satisfying guarantee period.

Summary data points may further include staffing party fee and invoicing information, such as the total amount of fees invoiced by the staffing party, the total amount of fees paid to the staffing party, the total amount of fees owed to the staffing party, the total amount of potential fees currently offered, the dollar value of each job submittal, the dollar value of each approved submittal, the dollar value of each staffing party user, average tee per placement, and the average days to fill a job order. In addition, summary date points may include hiring party conversion information (in terms of cumulative conversions and percentages), such as the candidate submittal to hiring party acceptance, the candidate acceptance to placement, and the candidate submittal to placement.

Furthermore, the talent platform exchange engine 122 may perform a variety of data processing activities. To perform data processing activities, the talent platform exchange engine 122 may access information stored in the data storage 116. Data processing methods and techniques that are performed by the talent platform exchange engine 122 can be executed by one or more processors, as further described with reference to FIG. 16.

Some of the data processing activities can include mapping or matching of information stored in the data storage 116 to related information received by the hiring application interface 120 and staffing application interface 118 of the talent platform exchange 102. Any methods or techniques of data integration can be used and may include methods of performing data driven mapping or semantic mapping by the talent platform exchange engine 122 to the related information stored in the data storage 116. For example, information relating to a candidate may be mapped to information stored in the data storage 116 based on the candidate's ID number.

Other data processing activities can include processing of authentication and registration information. The staffing party and the hiring party can provide the talent platform exchange with registration information at the enterprise level and at the individual user/admin level. In one embodiment, multiple users within the hiring party and staffing party organization can have a unique user name and password. Authentication processes can initially capture hiring party and the staffing party enterprise and user data, which can be shared with talent platform exchange at several authentication points. Using the enterprise and user data the talent platform exchange can identify users and the related activity.

Other data processing activities can include filtering of job orders received from the hiring talent platforms 108 to provide a subset of the received job orders to the staffing talent platform 104. These filtering data processing functions may direct job orders to the staffing parties that are in the best position to fill them. In one example, the filtering is based on information related to a particular staffing party or staffing talent platform, geographical information, job order information, as well as other information. For example, the talent platform exchange engine 122 determines that staffing party A specializes in placement within the legal field specifically in the New England area. The talent platform exchange engine 122 may filter job orders, creating a subset of job orders with data fields associated with geographical location matching geographical locations in the New England area and data fields with the category information matching the legal field. This subset of job orders can then be provided to staffing party A via the staffing talent platform A.

Figure 13:
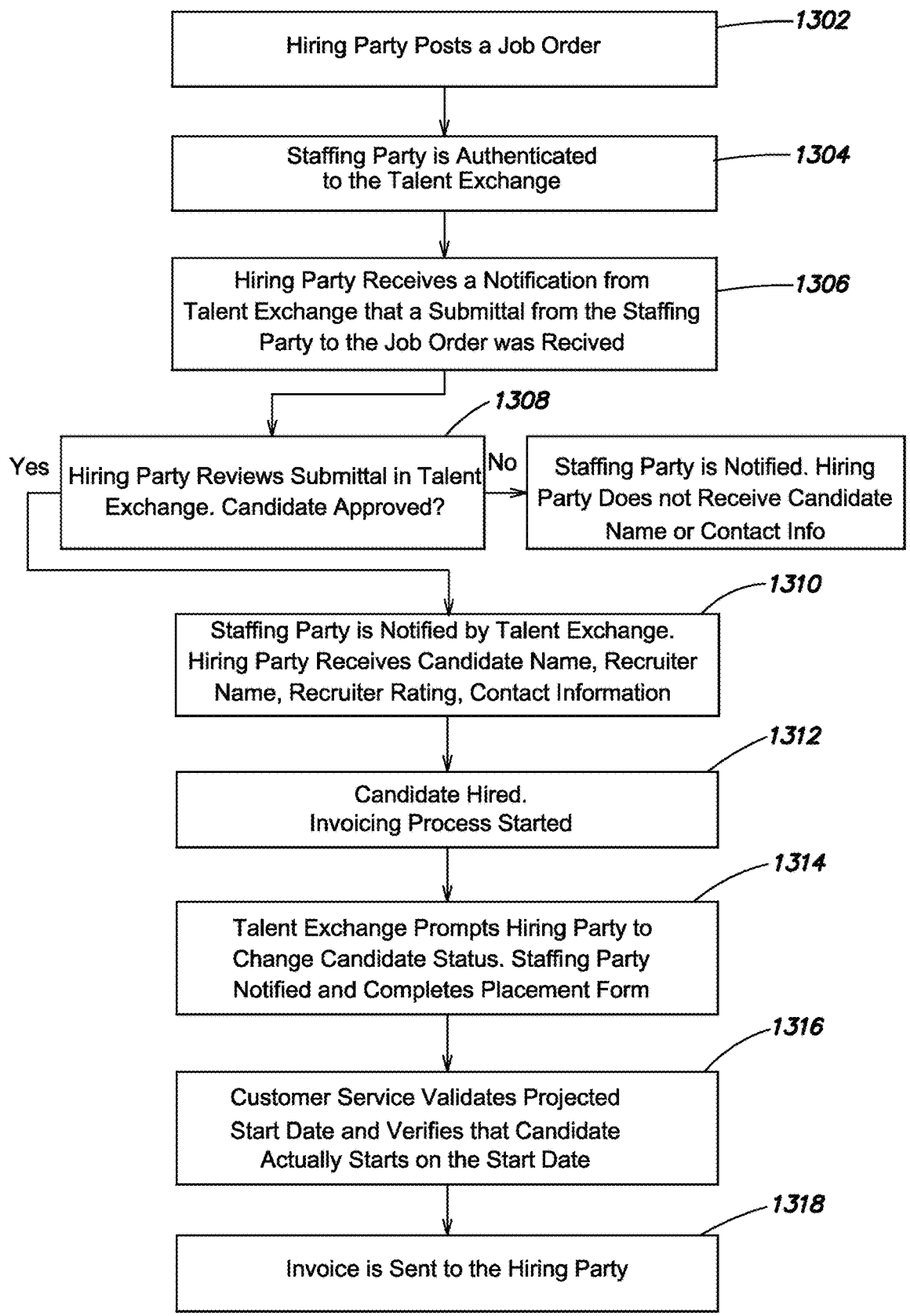
FIG. 13 is a flow diagram of a method for managing job order and candidate placement workflow.

In addition, the talent platform exchange 122 may provide processes for invoicing, collecting and distribution of funds as described below with reference to FIG. 13. At any point in these processes, the talent platform exchange can prompt the involved parties for input, sent verification data and notify customer service to verify information. Talent platform exchange 102 may further manage the invoicing, collection and payment distribution processes for the staffing party, the hiring party and the talent platforms. In one example, the talent platform exchange 102 may receive candidate status updates from both the hiring talent platform and the staffing talent platforms. For example, when a candidate status changes to "hired" or "placed" within the hiring talent platform, the talent platform exchange can follow the invoicing process describe further below.

Staffing Talent Platform

Figure 3:
FIG. 3 is an example illustration of a staffing talent platform provided to a staffing party.

FIG. 3 shows one example of the staffing talent platforms 104 used by the staffing party 106. The staffing talent platforms 104 may provide various interfaces for the staffing party, for example, a candidate interface to enter and edit candidate information, a workflow interface to manage placement of candidates through a workflow process, a company interface for management of company information and company contacts.

According to various examples, the staffing talent platforms 104 may provide an integrated talent platform exchange interface to access aspects and functions provided the talent platform exchange 102. As shown in FIG. 3, the talent platform exchange interface within the staffing talent platforms 104 is presented as an "XpressHire" icon. In one example, by clicking the "Xpresafire" icon, the staffing party 106 may access aspects and functions of the talent platform exchange 102 via the staffing application interface 118. In one embodiment, aspects and functions of the talent platform exchange 102 are displayed within the staffing talent platforms 104. Alternatively, the aspects and functions of the talent platform exchange 102 may be displayed in another interface, for example, as a separate window.

In one example, the talent platform exchange 102 can provide automatic authentication to the staffing party accessing the talent platform exchange via the staffing talent platforms 104. In one example, the staffing talent platforms 104 can share and/or authenticate a staffing party user data and login information with talent platform exchange 102. It is appreciated that this automatic authentication can eliminate the need for the staffing party to manually create a talent platform exchange account and separately log-in to the talent platform exchange.

The staffing talent platforms 104 may display job orders to the staffing party 106 provided by the talent platform exchange 102, in one example by displaying a sortable list of job orders. The job orders list may include additional information relating to each job order in one or more data fields, such as the date the job order was opened, the title of the job order and the company providing the job order, the job order status (e.g. open/active or closed), job order type (e.g. "Hot" or "Urgent") and category (e.g. IT, Banking, Accounting, Customer Service, etc.). The list of job orders may be sorted based on each of the job order fields. The staffing talent platforms 104 may also display to the staffing party 106 the job orders previously worked on by the staffing party, for example as a separate tab labeled "My Open Job Orders." The staffing talent platforms 104 may further display job orders previously saved by the staffing party, but which no candidates have been matched as a separated tab labeled "My Open Job Orders without Matches."

Figure 4:
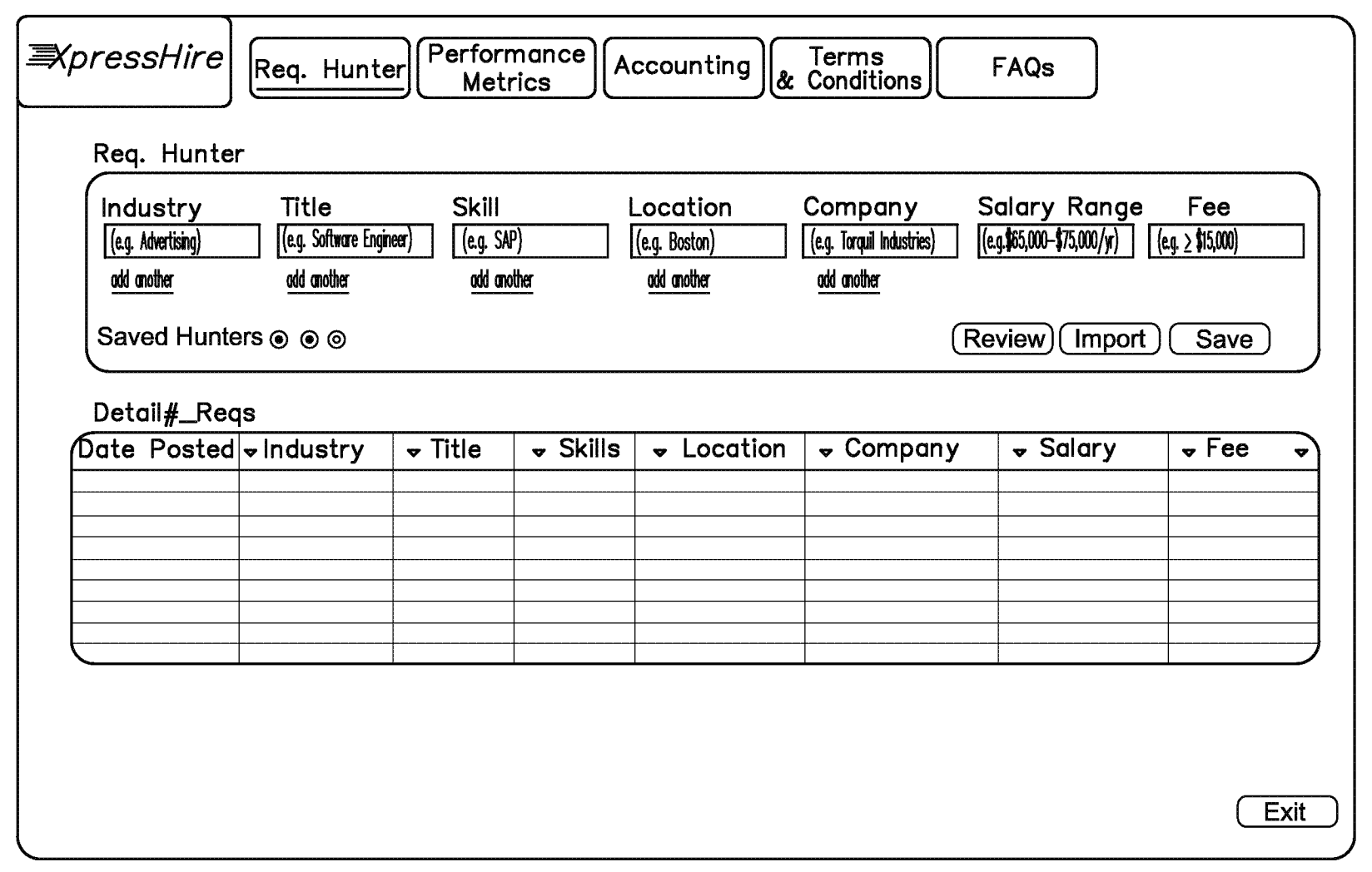

The staffing talent platforms 104 may provide for the staffing agent 106 to search the talent platform exchange 102 for job orders matching various criteria. FIG. 4 shows one example of a search interface (displayed within the staffing talent platforms as "Req Hunter"). Within the search interface, the staffing agent 106 may search for job orders by completing one or more job order data fields relating to various job order criteria, such as Industry, Title, Skill, Location, Company, Salary Range and Fee. Within each data field the staffing party may further select additional search criteria associated with job orders, for example by selecting "add another."

In one example, the staffing talent platforms 104 access the talent platform exchange 102 to retrieve search results matching the search criteria. After the staffing party 106 enters search criteria, the staffing party 106 can select "Review" to access the search results. In one example, the search results are displayed to the staffing party as a list of job orders below the selected search criteria. The staffing talent platforms 104 may further provide for the staffing party 106 to import one or more previously retrieved job orders into the selected list of job orders, for example, by selecting the "import" button.

In one example, the staffing talent platforms 104 may further provide for the staffing party to save the list of job orders retrieved as a result of the search, by for example selecting the "save" button. The selected list of job orders may be saved to the saved job orders list (i.e. "My Open Job Orders" as described above). Periodically, the staffing party platform 104 may perform the saved searches, in at least one example, to refresh the job orders displayed to the staffing party 106. In one example, the saved searches may be performed hourly, daily, or weekly. Any additional job orders located as part of the periodic searches can also be added by the talent platform exchange 102 to the saved job orders list. The staffing talent platforms 104 may further provide for the staffing party to review previously performed searches, for example, by selecting "saved hunters" radial buttons. In at least one example, any saved searches may be edited by changing the information in one or more data fields.

In various examples, the staffing talent platforms 104 may capture, generate and display performance metrics relating to one or more staffing parties. This metric information may provide the staffing parties with detailed and summary activity reports and performance metrics in real-time. Performance metrics may allow hiring parties to make decisions about selecting candidates submitted by the staffing parties. FIG. 5 shows one example of generating and displaying performance metrics. In one example, the performance metrics may be generated by accessing performance information stored on the talent platform exchange 102 via the staffing application interface 118. The performance information may be stored on the staffing talent platforms 104 and the hiring talent platforms 108 and provided to the talent platform exchange 102 via the staffing application interface 118 and the hiring application interface 120, respectively.

In at least one example, performance metrics may be based on staffing party's candidate placement information, such as the number of candidates submitted by the staffing party for job orders (i.e. "submittals"), number of candidates approved by the hiring party (i.e. "approved"), and number of candidates placed as employees with hiring parties (i.e. "placements"), as well as other information. The staffing talent platforms 104 may further display statistical analysis associated with the placement information, for example, cumulative total values. In one example, the statistical analysis may determine the percentage of submittals converted to placements (i.e. "conversion %"). As shown in FIG. 5, both the placement information and the statistical analysis may be displayed as a chart, allowing the staffing party to compare the information generated. For example, as shown in FIG. 5, the conversion percentage for this particular staffing party is 50 percent for approval of candidate by a hiring party and 10 percent for placement of candidates with a hiring party.

In some examples, the staffing talent platforms 104 may generate and display a rating associated with one or more staffing parties 106 (shown in FIG. 5 as "XpressHire Rating"). In one example, the rating is quantitative, tracking the staffing party's activity and candidate placement performance. The rating may be quantitatively based on one or more factors, such as volume of submittals, speed of submittals, candidate submittals that are approved versus rejected by the hiring party (and may include information about both sourcing of candidates and matching candidates), and candidate approvals that result in placements (may further include forming of relationships, negotiations with the hiring party and the final placement of the candidate). In one example, the rating may be based on A/B testing or bucket testing of two similarly situated staffing parties.

In one example, the rating tracks actual performance of the particular staffing party 106 instead of providing a subjective rating or reflecting staffing party name recognition. Further, it is appreciated that consistent rating criteria may be used to evaluate staffing across multiple independent organizations, thus providing a tool for evaluating placement organizations.

Rating information can also influence decisions by the hiring party to place a candidate. In one example, candidates associated with staffing parties with higher ratings are placed above other candidates in the list of candidates provided to the hiring party. The rating may be displayed to the staffing party 106 as a graphical representation. As shown in FIG. 5, the rating is displayed as a series of stars. However, any graphical representation may be used.

In one example, the staffing party 106 may select to display any metrics available from the staffing talent platforms 104. In another example, the staffing party 106 may limit the display of performance metrics by selecting a date range to display placement information. As shown in FIG. 5, in one example, the staffing party 106 may enter a "from" date and at "to" date to display metrics relating to the staffing party 106 for that particular period of time. The staffing party 106 may select one or more of the cumulative results, and the staffing talent platforms may display detailed job order information associated with the cumulative results. For example, the staffing party 106 may select "# approved" and receive job order and candidate information for each candidate that has been approved by the hiring party.

In at least one example, the individual staffing party 106 may have access to their individual performance metrics. While staffing parties 106 with administrator permissions may view performance metrics for multiple users and/or departments. Both may view performance metrics for a defined date range.

Figure 6:
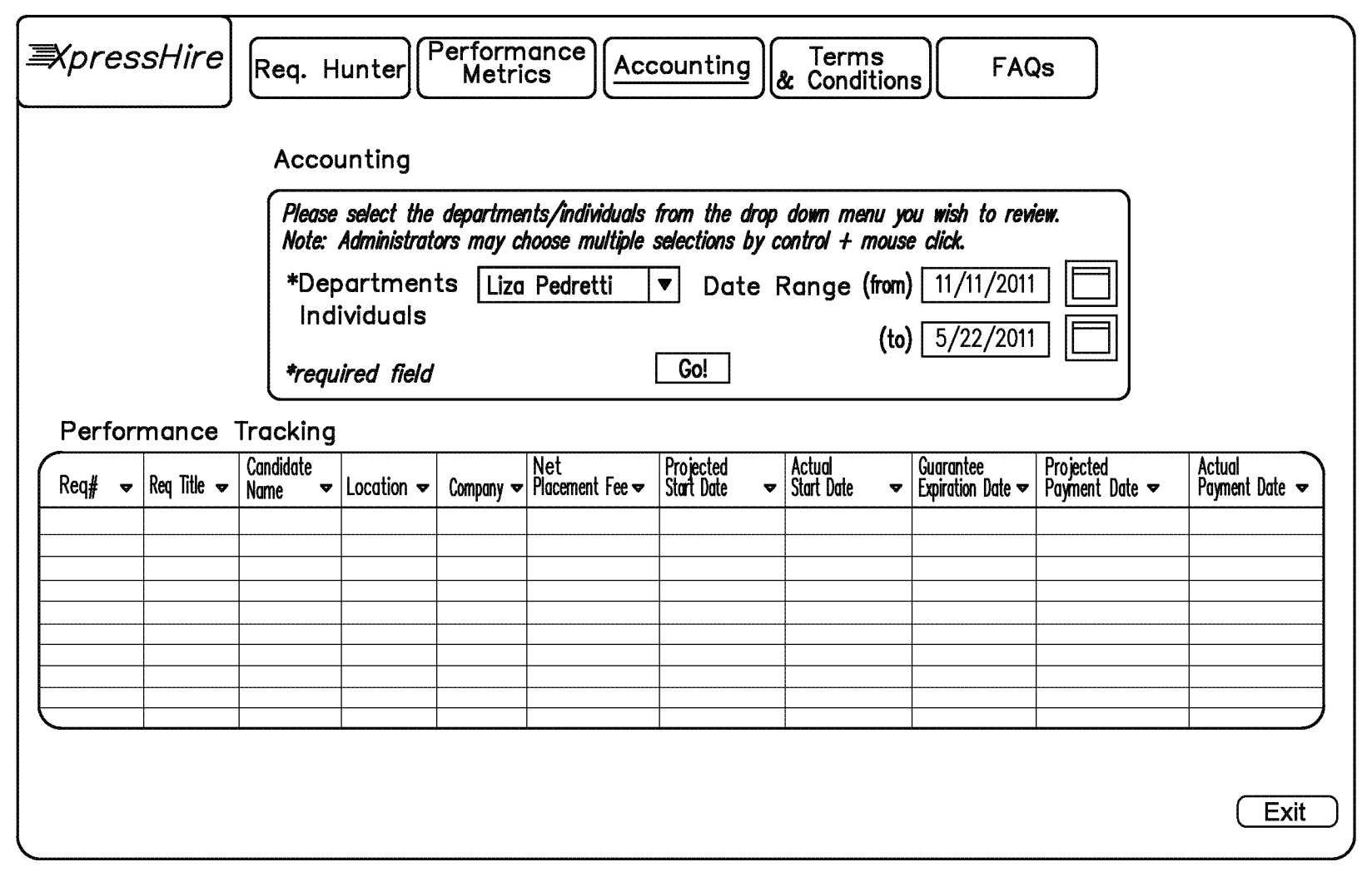

According to various examples, the staffing talent platforms 104 may generate and display accounting information relating to one or more staffing parties 106. Accounting information may allow one or more staffing parties 106 to track payment information, for example, fees paid and fees to be paid by the hiring party for placements by the staffing party. FIG. 6 shows one example of generating and displaying accounting information. In one example, the accounting information may be generated by accessing placement tracking information stored on the talent platform exchange 102 via the staffing application interface 118. The placement tracking information may be stored on the staffing talent platforms 104 and the hiring talent platforms 108 and provided to the talent platform exchange 102 via the staffing application interface 118 and the hiring application interface 120, respectively.

In one example, the accounting information may include job order information (e.g. req. # and req. title, location, and company), payment information (e.g. net placement fee, projected payment date, and actual payment date) and placement information (e.g. projected start date, actual start date, and guarantee expiration date). According to one example, the guarantee period (or a retention period) is a period of time when a refund may be issued to the hiring party if the candidate (now employee) is terminated or terminates. For example, the hiring party pays the placement fee only if the candidate is selected to be placed by the hiring party and the guarantee period is satisfied. In one example, the guarantee expiration date is set at 90 calendar days after the actual start date and the projected payment date is set at 100 calendar days after the actual start date.

The staffing party may need to review and agree to Terms and Conditions provided by the staffing talent platforms 104 before proceeding to view and match candidates with job order provided by the talent platform exchange 102. In one example, the talent platform exchange may require the staffing party to agree to the terms before accessing the job orders provided by the talent platform exchange 102. According to embodiments of the present invention, having each staffing party agree to one uniform set of terms and conditions avoids the hiring parties to have to sign individual business agreements with each individual staffing party. One or more terms and conditions may be related to the staffing party and candidates to be provided by the staffing party. Whether the staffing party has agreed to the terms and conditions may be stored in the data storage 116. The staffing talent platforms 104 may also provide a Frequently Asked Questions (FAQ) screen that may provide information about the talent platform exchange 102.

Candidate Placement Workflow

Figure 7:
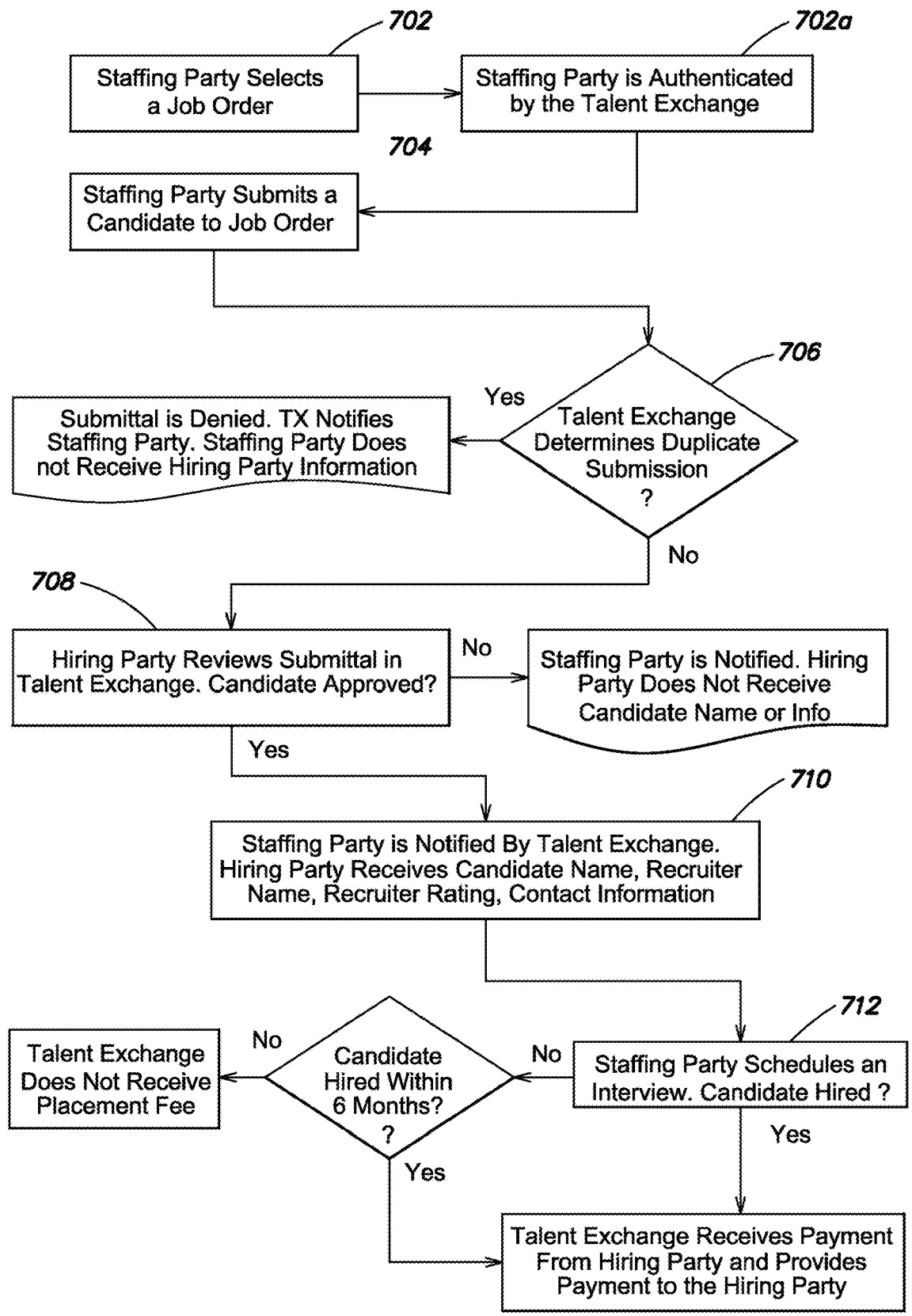
FIG. 7 is a flow diagram of a method for managing candidate placement workflow.

One example of candidate placement workflow is described with reference to method 700 illustrated in FIG. 7. In block 702, the staffing party selects a particular job order from the list of job orders, discussed above, for which the staffing party wants to make a referral. The staffing party may then select a candidate from one of the candidates stored in the staffing talent platforms to match to the particular job order.

In block 702a, before the staffing party can submit a candidate to the job order, the staffing party may be authenticated by the talent platform exchange, in one example, the talent platform exchange can provide automatic authentication to the staffing party accessing the talent platform exchange via the staffing talent platforms 104. In one example, the staffing talent platforms 104 can share and/or authenticate staffing party user data (account information) and login information with talent platform exchange 102. It is appreciated that this automatic authentication can eliminate the need for the staffing party to manually create a talent platform exchange account and separately log-in to the talent platform exchange.

In block 704, the matched candidate may be submitted to the particular job order by the staffing party. The staffing talent platform may provide for staffing party submittal template including candidate data fields. These fields may include verification of information relating to the candidate, for example candidate interview, submission of candidate references, the candidate's sense of urgency or alignment of the candidate qualifications and career goals with job specifications through knock-out questions described further below. According to embodiments of the present invention, this submittal template may ensure that hiring parties receive qualified and interested candidates that have been properly interviewed and screened.

The information related to the submittal may be sent to the talent platform exchange 102 and may be provided to the hiring party associated with the job order. For every candidate submitted by the staffing party, the talent platform exchange 102 may generate and store in the data storage a unique ID number and may further create and store in the data storage a time and date stamp for each submittal candidate submittal and candidate approval. The talent platform exchange may further associate the submitted candidate with a particular staffing party, the job order ID number and the hiring party company and may store the association as a data field value in the data storage.

In block 706, the talent platform exchange 102 manages duplicate submissions of the same candidate from one or more staffing parties for the same job order. By centralizing the submittal process, the talent platform exchange may prevent the hiring party from receiving duplicate submittals from multiple staffing parties (or the same party) and avoid conflicts that may arise. In one example, the talent platform exchange provides a duplicate submission process that allows the talent platform exchange to accept only the first candidate submittal to a job order. In one example, if another staffing party submits the same candidate to any job order at the same hiring party within the predetermined period of time (e.g. six months) of the candidate approval date, then the candidate can be rejected as a duplicate submittal by the talent platform exchange. In one example, if the submittal is denied by the talent platform exchange 102, the talent platform exchange 102 may notify the staffing party of the duplicate submission.

In block 708, in one example, if the submittal is approved by the talent platform exchange, the submitted candidate is provided to the talent platform exchange. The talent platform exchange notifies that hiring party, via the hiring talent platform, that a submission has been made for a job order. The hiring party may review the submission within hiring party platform and determine whether the hiring party would like to proceed with interviewing the candidate. If the hiring party agrees to proceed, the hiring party notifies the talent platform exchange that the candidate is approved.

In one example, at the time of submittal the talent platform exchange provides a subset of the hiring party's details to the staffing party (such as company name, position location, placement fee or "out to bid"), concealing, for example, the hiring party's contact name and contact information, until the hiring party expresses interest in the candidate submitted by the staffing party. In at least one example, if the submittal is denied in the duplicate submittal process (block 706), or the hiring party does not approve the candidate (block 708), the staffing party does not receive hiring party information.

In block 710, the talent platform exchange may notify the staffing party that the candidate has been approved by the hiring party. FIG. 8 shows one example of the notification to the staffing party. In one example, at the time of submittal the talent platform exchange provides a subset of the staffing party's details to the hiring party (such as candidate's first name), concealing the rest of the candidate's contact information and the staffing party information until the hiring party has expressed interest in the candidate. In at least one example, if the hiring party approves the candidate (block 708), talent platform exchange may release the hiring party the rest of the concealed information, such as, for example the candidate's last name, recruiter name, recruiter company and recruiter contact information.

In one example, this method of concealing some of the information to both the staffing and the hiring parties prevents the parties from excluding the talent platform exchange out of the placement processes. For example, it may prevent the hiring party from contacting the candidate directly without working with the staffing party and it may also prevent the staffing party from contacting the hiring party directly and avoiding the duplication process.

Figure 9:
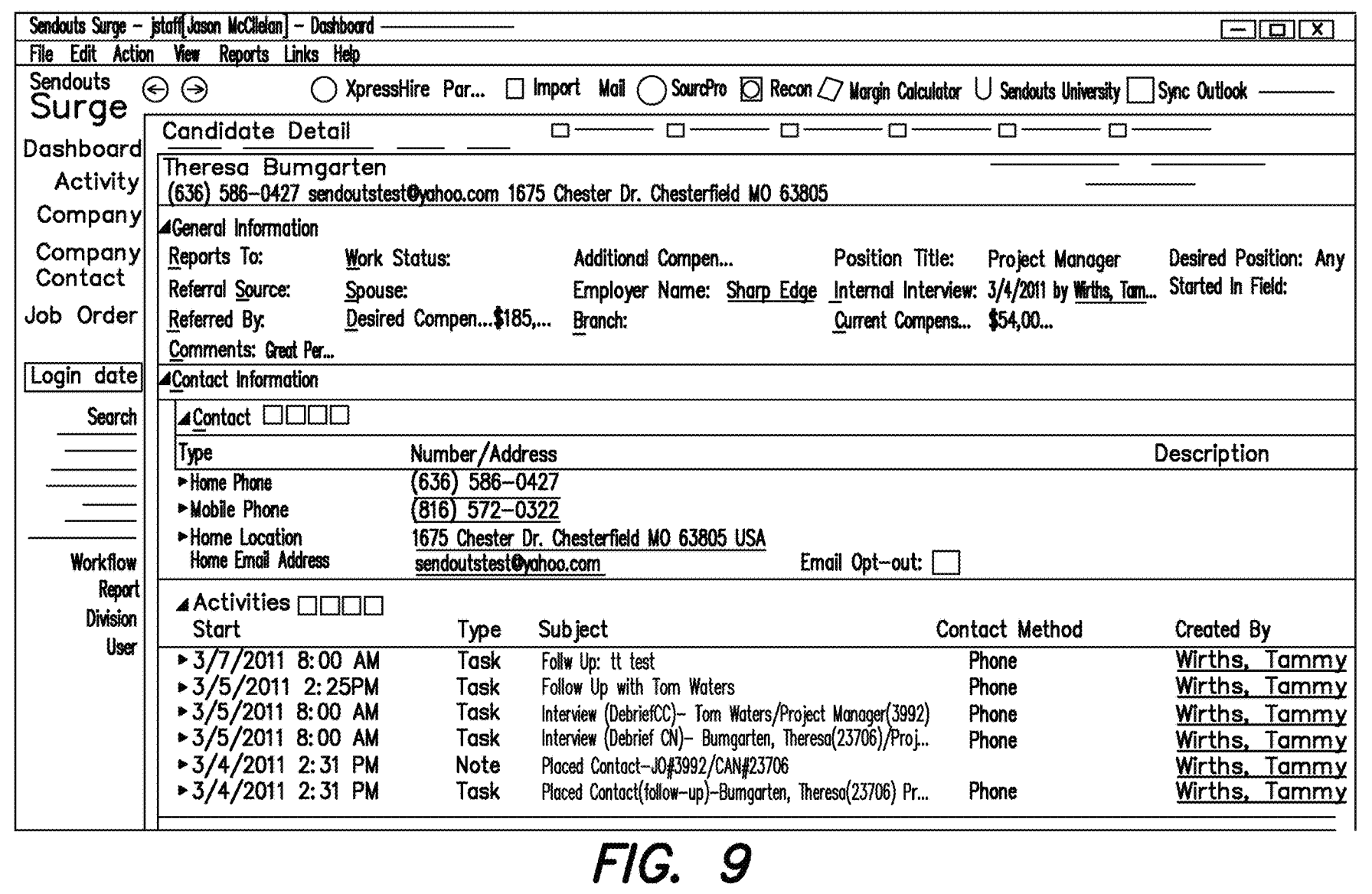

In one example, the talent platform exchange 102 may provide a candidate management interface to the staffing agent 106. For example, the staffing talent platforms 104 may display for the submitted candidate a list of one or more activities associated with that candidate. The activities may include historic information associated with placement of the candidate, or tasks that have been completed or may need to be performed by the staffing party to complete the placement of the candidate. For example, as shown in FIG. 9, the list of activities displayed includes the date the candidate was submitted, the date the candidate's resume was sent to the hiring party, the date the interview was scheduled and the tasks may include follow up reminders, and reminders to contact the hiring party to schedule an interview.

According to at least one example, if a candidate is approved by the hiring party, then the hiring party must honor the referral for the staffing party for a predetermined and agreed upon period of time (e.g. six months) from the approval date. It is appreciated that, by honoring the first candidate submitted to the hiring party for the predetermined period of time, the talent platform exchange may create a sense of urgency and competition among staffing parties. This sense of urgency and competition may increase the speed of candidate submittals by the staffing party to the posted job orders. In one example, the hiring party is not notified or is aware of duplicate submittals.

In at least one example, the talent platform exchange communicates with the staffing party, via the staffing talent platform through different stages of the placement process. Some of the communications may include feedback on candidate submittals, at the point of submission, approval, denial, interview, placement and start. Other information, for example candidate information, may be provided in these communications. Communication channels may take a number of forms, for example, email, notification windows, or text messages.

For example, if the candidate was successfully submitted for a job order the talent platform exchange may generate and send an email message to the staffing party to notify the staffing party of an accepted submission. In another example, if the submitted candidate is a duplicate as described above, the talent platform exchange may display a notification window alerting, the staffing party of the duplicate submittal. Furthermore, the staffing talent platform may allow for the staffing party to communicate with the candidate to let the candidate know the hiring parties the candidate was submitted.

In block 712, the hiring party may interview the candidate and if the candidate is placed, the hiring party may notify the talent platform exchange of the placement. The talent platform exchange may provide a notification to the staffing party and may provide for the staffing party to contact customer service of talent platform exchange in order to process a payment fee, further changing the candidate status to "placed" or "hired". In one example, the hiring party may pay the fee only if the candidate is hired. In another example, if the hiring party closes the job order but subsequently hires the candidate in a predetermined time period (for example 6 months) the hiring party pays the placement fee to the talent platform exchange.

Hiring Party Platform

Figure 10:
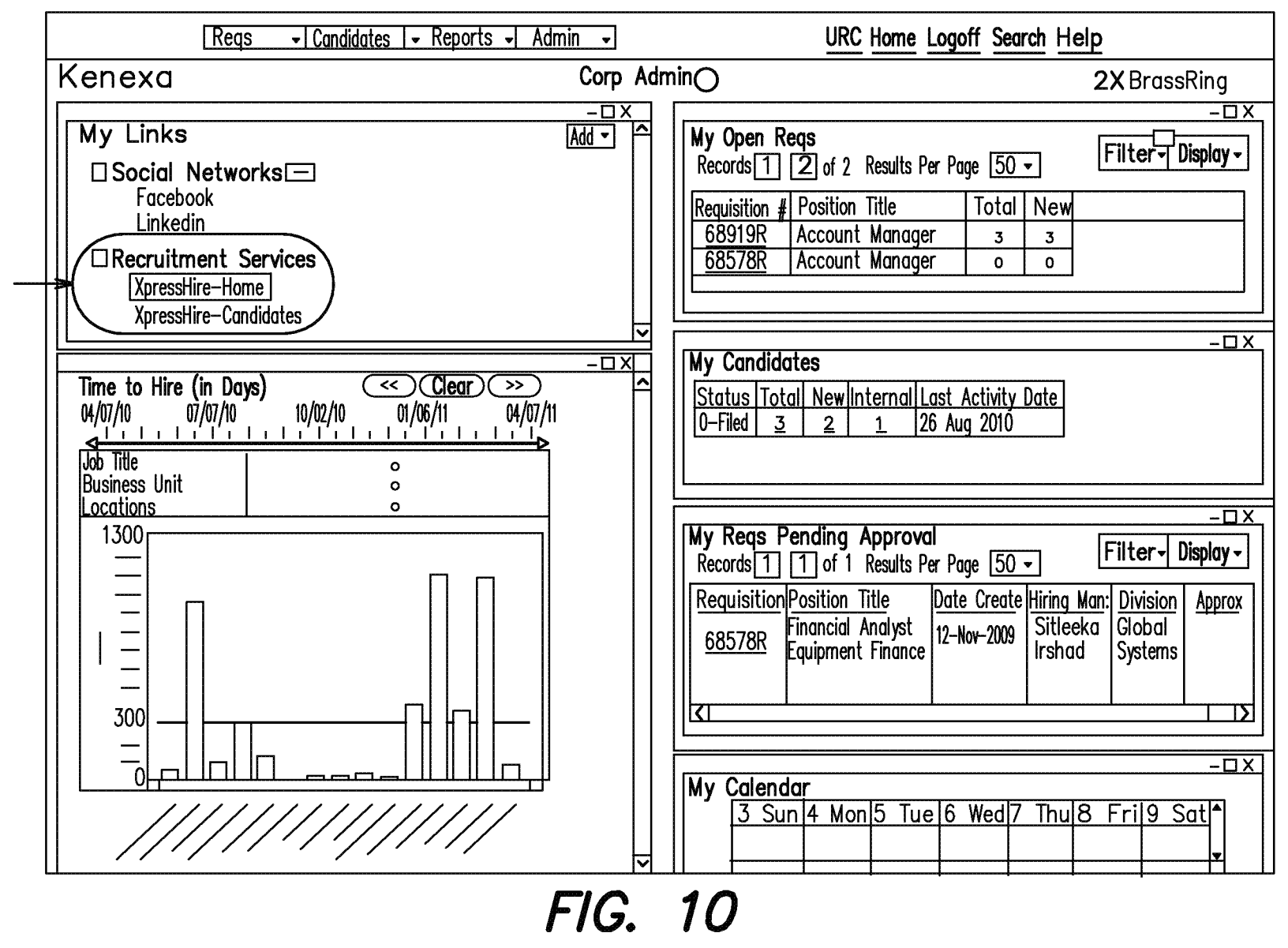

As described above with regard to the staffing talent platforms, the talent platform exchange interface may be provided within the hiring talent platform. FIG. 10 shows one example of the hiring talent platforms 108 used by the hiring party 110. The hiring talent platforms 108 may provide various interfaces for the hiring party. For example, a "Req" interface to enter and edit job order information, a candidate interface to manage interview and placement of candidates, a calendar interface for management of hiring party schedule and a reports interface for visually displaying job order and placement reports.

The hiring talent platforms 108 may display job orders placed by a particular hiring party, for example within "My Open Reqs" section of the hiring talent platforms 108. The hiring party 110 may create new job order or manage existing open job orders within this section of the hiring talent platforms 108. By selecting the individual job order the hiring talent platform may display details of the selected job order, for example by displaying a "Job Req Detail" page. The hiring party 110 may view or edit details displayed on the "Job Req Detail" page.

According to various examples, the hiring talent platforms 108 may provide an intergraded talent platform exchange interface to access aspects and functions provided the talent platform exchange 102. As shown in FIG. 10, the talent platform exchange interface within the hiring talent platforms 108 is presented as an "XpressHire Home" icon. In one example, by clicking the "XpressHire Home" icon, the hiring party 110 may access the talent platform exchange 102 via the hiring application interface 120. In one embodiment, the aspects and functions of the talent platform exchange 102 are displayed in another interface, for example, by opening a separate window. In another embodiment, aspects and functions of the talent platform exchange 102 are displayed within the hiring talent platforms 108, for example as one or more user selectable icons.

Figure 11:
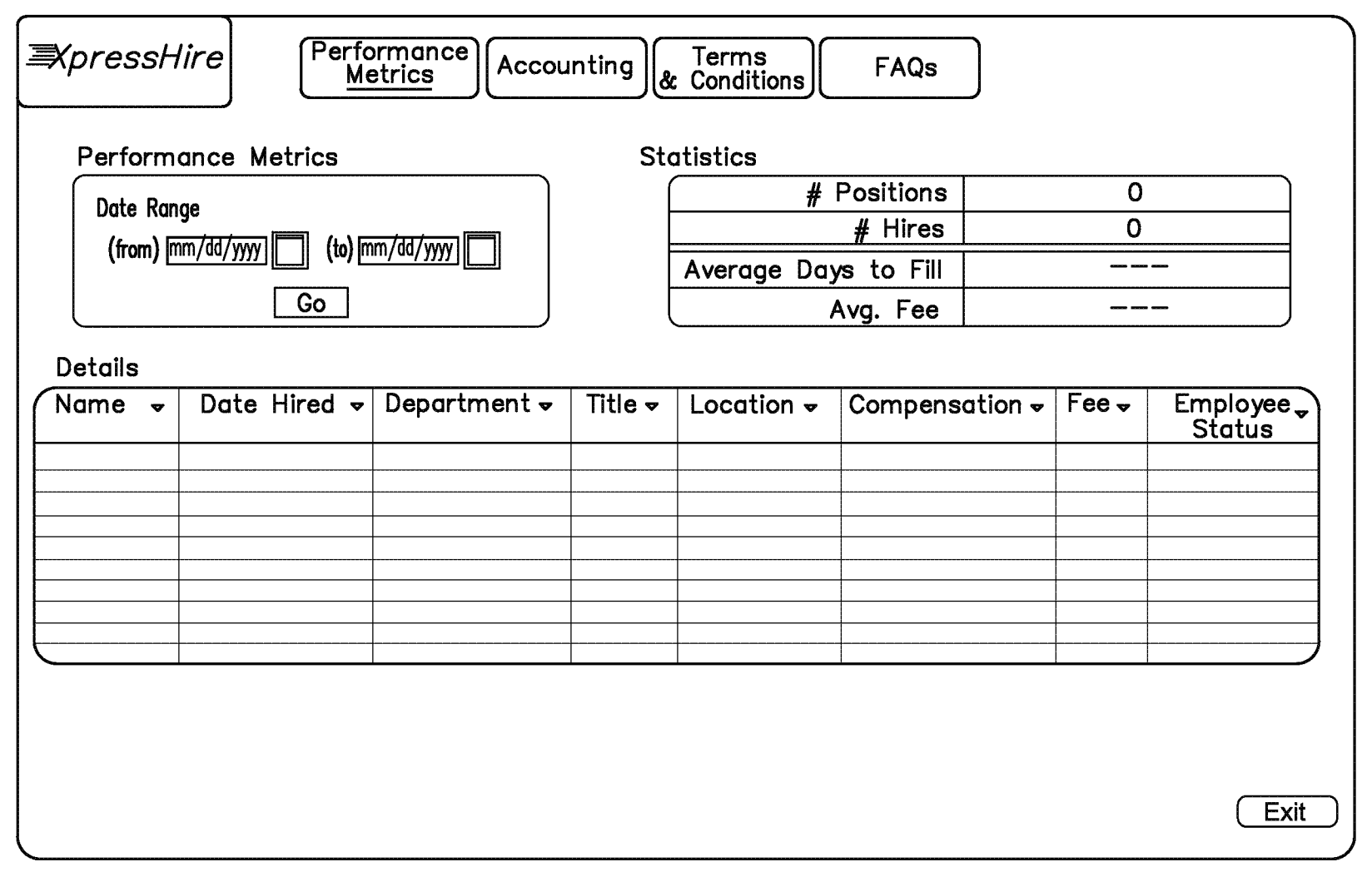
Figure 12:
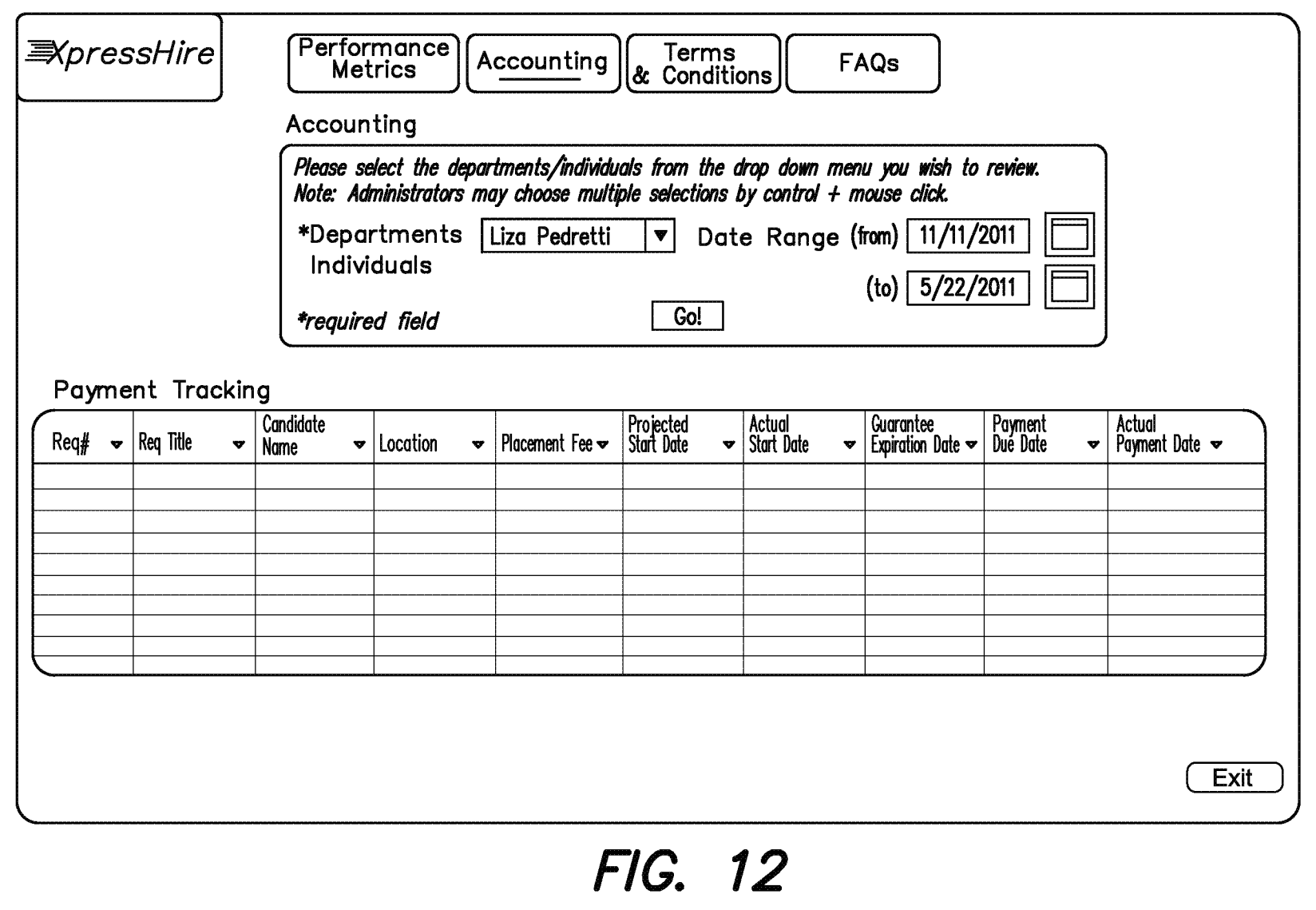

FIG. 11 shows one example of the talent platform exchange interface displayed separately allowing the hiring party to access the aspect and functions of the talent platform exchange 102. In various examples, the hiring talent platforms 108 may generate and display performance metrics relating to hiring parties. This metric information may provide the hiring parties with detailed and summary activity reports and performance metrics in real-time. FIG. 12 shows one example of generating and displaying performance metrics for the hiring party. In one example, the performance metrics may be generated by accessing performance information stored on the talent platform exchange 102 via the hiring application interface 120. The performance information may be stored on the hiring talent platforms 108 as performance information is generated by the hiring party 110 and provided to the talent platform exchange 102 via the hiring application interface 120 and the staffing interface 104, respectively.

In at least one example, performance metrics may be based on hiring party's job order and candidate placement information, such as the number of job orders (i.e. "positions"), number of candidates placed by hiring party (i.e. "hired"), as well as other information. The hiring talent platforms 108 may further display statistical analysis associated with the placement information, for example average placement values. In one example, the statistical analysis may calculate the average number of days to fill open job orders (i.e. "avg. days to fill") and the average fee paid by the hiring party (i.e. "avg. fee). As shown in FIG. II, both the placement information and the statistical analysis may be displayed as a chart, allowing the hiring party to compare the information generated.

In one example, the hiring party 110 may select to display any metrics available from the hiring talent platforms 108. In another example, the hiring party 110 may limit the display of performance metrics by selecting a date range to display placement information. As shown in FIG. 11, in one example, the hiring party 110 may enter a "from" date and at "to" date to display metrics relating to the hiring party 110 for that particular period of time. The hiring party 110 may select one or more of the average results, and the staffing talent platforms may display detailed information associated with the average results. Details may include name of candidate, date hired, department, title, location, compensation, fee, and employee status, as well as other candidate and job order information.

In at least one example, the individual hiring party 110 may have access to their individual performance metrics. While hiring parties 110 with administrator permissions may view performance metrics for multiple hiring parties and/or departments within the hiring party organization. Both may view performance metrics for a defined date range.

According to various examples, the hiring talent platforms 108 may generate and display accounting information relating to one or more hiring parties 110. Accounting information may allow one or more hiring parties 110 to track payment information, for example, fees paid and fees to be paid by the hiring party for placements by the staffing party. FIG. 12 shows one example of generating and displaying accounting information for a hiring party. In one example, the accounting information may be generated by accessing placement tracking information stored on the talent platform exchange 102 via the hiring application interface 120. The placement tracking information may be stored on the hiring talent platforms 108 and the staffing talent platforms 104 and provided to the talent platform exchange 102 via the hiring application interface 120 and the staffing application interface 118, respectively.

In one example, the accounting information may include job placement information (e.g. req. # and req. title, candidate name and location), payment information (e.g. placement fee, payment due date, and actual payment date) and placement information (e.g. projected start date, actual start date, and guarantee expiration date). As described above with reference to FIG. 11, the hiring party may select a date range to display accounting information. In addition, the hiring party may display individual accounting information for that particular party. If the hiring party has administrative permissions, the hiring party may access performance metrics for multiple hiring parties and/or departments within the hiring party organization.

The hiring party may need to review and agree to terms and conditions provided by the hiring talent platforms 108 before proceeding to view and match candidates with job order provided by the talent platform exchange 102. One or more terms and conditions may be related to the hiring party and/or candidates to be provided by the staffing party. Whether the hiring party has agreed to the terms and conditions may be stored in the data storage 116. The hiring talent platforms 108 may also provide a Frequently Asked Questions (FAQ) window that may provide information about the talent platform exchange 102.

Job Order and Candidate Management Workflow

One example of job order workflow is described with reference to method 1300 illustrated in FIG. 13, In block 1302, the hiring party may create a job order within the hiring talent platforms 108 which the hiring talent platform posts to the talent platform exchange. In one example, the hiring party can select to post a new job order within the hiring party platform. In one example, the hiring party may view details of previously posted job orders by clicking the "Requisition ID #" link within the My Open Reqs section, which may open a new window with the Job Req Detail page. Within the Job Req Detail page, the hiring party can view the posting options page, in one example by selecting "Posting Options" on the Job Req Detail page.

Before posting a job order to the talent platform exchange, the hiring party may need to agree to the Terms and Conditions associated with the talent platform exchange. In one example, the talent platform exchange may require the hiring party to agree to the Terms and Conditions before accessing the candidates provided by the talent platform exchange 102. According to embodiments of the present invention, having each hiring party agree to one uniform set of Terms and Conditions avoids the staffing parties to have to sign individual business agreements with each individual hiring party.

In block 1304, before a job can be posted to the talent platform exchange, the hiring party may need to be authenticated by the talent platform exchange. In one example, the talent platform exchange can provide automatic authentication to the hiring party accessing the talent platform exchange via the hiring talent platforms 108. In one example, the hiring talent platforms 108 can share and/or authenticate hiring party user data (account information) and login information with talent platform exchange 102. It is appreciated that this automatic authentication can eliminate the need for the hiring party to manually create a talent platform exchange account and separately log-in to the talent platform exchange.

The talent platform exchange may provide for the hiring party to enter the job order information into a standardized job order form. Using such a form may provide for a common standard of job orders provided for staffing parties, making it easier for them to review the provided information. In one example, the talent platform exchange may allow the hiring party to post the job order on a placement fee basis or a "out to bid" basis. The placement fee basis allows the hiring party to set a one fee for any staffing party submitting candidates. Alternatively, the "out to bid" basis allows the staffing parties to bid a placement tee for each submitted candidate.

The talent platform exchange receiving the new job order may time/date stamp each job order and may create a job order ID number for each job order submitted by the hiring party 110. The talent platform exchange may additionally manage the period of time the job order may be active on the talent platform exchange 102. If the job order is active, one or more staffing parties may submit candidates for the active job orders and the job orders may be provided to the staffing party as part of the search features. If the active period of time for the job order is exceeded, the talent platform exchange may change the job order status to inactive. In one example, inactive job orders are not displayed to the staffing parties. For example, the posted job orders may be active for sixty calendar days.

As described above with reference to the candidate placement workflow described with reference to FIG. 7, the talent platform exchange may not reveal the hiring party contact name or contact information to the staffing party until the hiring party has expressed interest in the candidate. Therefore, talent platform exchange may process the posted job orders and conceal the hiring party information from the job orders viewed by the staffing party.

In one example, talent platform exchange 102 may not allow the hiring party 110 to modify or update a job order after the hiring party has posted the job order to the talent platform exchange 102. According to one example, the talent platform exchange 102 may prompt for the hiring party to update job orders after a predetermined period of time (e.g. every 30 days). Furthermore, hiring parties updating job orders more frequently than the predetermined period of time may receive a higher volume of candidate submittals. In some examples, a hiring party 110 desiring to make a material change to a job order may need to close the previously posted job order and post a new (i.e. updated) job order. By closing the previously posted job order, the talent platform exchange 102 may insure accurate information presented to the staffing party.

Job orders posted to the talent platform exchange 102 may displayed to the staffing parties in the staffing talent platforms 104 who may then submit candidates to those open job orders, as discussed above. In block 1306, the hiring party may receive a notification from talent platform exchange that a submittal from the staffing party to the job order was received by the talent platform exchange 102.

In block 1308, the hiring party can then review submitted candidates from various staffing parties 106. The hiring party 110 can access the submittals within the hiring talent platforms 108, in one example by selecting a candidate interface provided by the talent platform exchange 102. For example, as shown in FIG. 10 by clicking on the "XpressHire-Candidates" link in the Recruitment Services folder within the My Links section.

In one example, the candidate interface may be displayed in a separate window. FIG. 14 shows one example of the candidate interface. The candidates submitted by the various staffing parties may be displayed as a chart and may be organized by job order ID number. The chart may also display the job order title, job location, number of new candidates submitted for the job order, and number of total candidates submitted. In one example, new candidates are those submitted by the staffing parties but not yet reviewed by the hiring party. In this candidate interface, the hiring party may be able to remove or cancel a job order.

The hiring party 110 may view the detailed list of submitted candidates for each job order. For example, as shown in FIG. 14 the detailed candidate list can be displayed by selecting the "#" in the "total candidates" column FIG. 15 shows one example of a detailed candidate list. The details of each candidate may be displayed in the form of the submittal template, discussed above. The submittal template may include candidate information such as, a profile summary, experience summary, education summary, motivating factors, responses to "knock-out" questions, availability, interest level and resume. As described above, the talent platform exchange conceals some of the candidate and staffing party information, but may also reveal the recruiter rating, and the candidate's first name. The information revealed may provide enough information for the hiring party to review and make a decision regarding approval of the candidate.

In one example, the candidates can be arranged according to recruiter rating, such as from high recruiter rating to low recruiter rating. According to one embodiment, hiring parties are more likely to select candidates submitted by staffing parties with higher ratings, encouraging staffing parties to improve ratings in order to influence hiring party decisions.

According to embodiments of the present invention, the hiring talent platform may provide for the hiring parties 110 to limit the volume of resumes received for any given job order. The hiring parties will be able to manage the volume and velocity of candidate submittals by setting "knock-out" answer limiters. In one example, "knock-out" answer limiters include a series of prompts set out to the staffing party that go to elements of the job order, such as specific types of skills needed for the job, geographical limiters, travel limiters, salary limiters, as well as other limiters. The hiring party may change the limiters to either broaden or narrow the candidate pool. The hiring party 110 may further change these limiters in anticipation (or reaction) to the candidate submittal activity. In addition, the hiring party may place the position "on hold" to prevent submittals from the staffing parties 106, by preventing the job orders from appearing in the staffing party's search results, as described above with reference to active job orders.

According to various examples, the hiring talent platform can assign candidates within the candidate listing a status, based on the hiring party's interest in the candidate. For example, the status can be "waiting," "interested" or "not interested." In one example, the status of "waiting" is associated with the candidate until the hiring party either selects that the hiring party is "interested" or "not interested" in the candidate. According to various examples, if the hiring party indicates "not interested" in the candidate, then the candidate is removed from the candidate list. The status change can be provided to the talent platform exchange and stored in the data storage 116.

If the hiring party 110 indicates that they are "interested" in the candidate, the information concealed by the talent platform exchange 102 may be transmitted from the talent platform exchange 102 to the hiring talent platform 108 and may populate the data fields associated with the candidate. In one example, this concealed information associated with this candidate can also be stored in the hiring talent platform 108.

Staffing party 106 can schedule an interview and hiring party 110 can make a hiring decision. According to one example, the talent exchange 102 may provide the hiring party 110 with feedback designed to assist the hiring party with placement. For example, if the hiring party is having difficulty filling a position through the talent platform exchange 102, the feedback may suggest for the hiring party to broaden the hiring limitations, increase the placement fee, shorten the guarantee period or strengthen the value proposition (increase compensation, improve learning curve, etc). In this example, the hiring party implements the feedback by making modification to the job order. The talent exchange may determine that the job order has been listed in the talent platform exchange for a particular period of time, and generate feedback when the period of time exceeds a threshold (e.g. three months). In one example, the feedback is presented to the hiring party 110 by the talent exchange 102 as a series of prompts, each suggesting a different course of action.

If the candidate is hired or placed, the hiring party can finalize offer information and may provide offer information to the talent exchange. In one example, offer information includes start date, salary, and guarantee or provisional period as well as other offer information. This information can be stored in the data storage 116 of the talent platform exchange 102.

In block 1312, the talent platform exchange can start the invoicing process, which can include steps of supplying placement forms, resolving discrepancies, verifying candidate start and sending the invoice to the hiring party. First, in block 1314, the talent platform exchange may prompt the hiring party to change candidate status. In one example, talent platform exchange emails a placement form to the staffing party upon a candidate status change to "hired" or "placed" within the hiring talent platform. Talent exchange then notifies the staffing party of the update and requests to complete and return the placement form. In one example, the placement form may include a series of prompts provided by the talent platform exchange 102 within the staffing talent platform 104 regarding the negotiated terms of employment, such as salary and start date information. Customer service 114 may follow-up if the placement form is not returned within a predetermined period of time (e.g. 24 hours). Customer service 114 can verify and resolve any discrepancies between the offer information provided by the hiring party and information provided in the placement form and can contact the parties involved including the hiring party, the staffing party and the candidate.

In block 1316, customer service 114 can contact the staffing party and/or the candidate prior to the projected start date prior to the projected start date (e.g. one week), to validate the start date and that the candidate has given notice to previous employer. Customer service 114 can also verify and resolve any discrepancies and can contact the parties involved, including the hiring party, the staffing party and the candidate. On the projected start date, customer service 114 can contact the hiring party, staffing party and/or the candidate to verify that the candidate has actually started at the new employer and can verify invoice/billing contact information, Independent verification of start date by the customer service ensures that both the hiring parties and the staffing parties uphold the conditions imposed on them by the talent platform exchange, for example, that the placement of the candidate is accurately represented.

In block 1318, if the candidate has started employment, then talent platform exchange can send an invoice to the new employer. Customer service 114 can verify and update the actual start date stored in the data storage 116 of the talent platform exchange 102 upon receiving hiring party verification. The guarantee expiration date and the projected payment date can also be updated once the actual start date has been verified and/or revised by customer service. Customer service 114 can verify and resolve any discrepancies and can contact the parties involved including the hiring party, staffing party and candidate.

According to one embodiment, the fee distribution model can include a percentage of placement fee distributed to all of the involved parties. The placement fee may be set by the hiring party as a percentage for the candidate's starting annual salary. Alternatively, the hiring party may choose to put the job order "out to bid," allowing the staffing party to submit qualified candidates with corresponding bids (or placement fees). In either scenario, the placement fee may be due to the staffing party upon candidate hire. In one example, the placement fee is set to 20% of the candidate's first year annual salary. According to one example of a distribution model, the staffing party fee is distributed 75% of the placement fee, the staffing talent platforms and the hiring talent platform providers (ATS partners) each receiving a percentage of the fee (e.g. 7.5%), and the talent platform exchange receiving another percentage (e.g. 10%). However, it should be appreciated that other fee distribution models and placement fees can be used or negotiated with the talent platform exchange 102.

Once the payment of the placement fee has been received from the hiring party and the guarantee period has been satisfied (for example, 90 calendar days from start date), then talent platform exchange can process the payment to the staffing party, and the ATS partners involved in the transaction. In one example, the partner ATS payments can be distributed within a predetermined period of time (e.g. 10 calendar days) after the full payment has been received and guarantee period has been satisfied.

Other Features and Implementations

According to various aspects of the present invention, the talent platform exchange may include one or more additional features and functionality as discussed in more detail below. Such features may be implemented in addition to any other feature discussed herein, in any combination with one or more other features.

According to one embodiment of the present invention, a bidding feature may be provided that allows employers to establish a placement fee for each job posting by entering a percentage of an annual salary of the job posting for a placement fee. In one embodiment, the player may elect to have the job posting "open to bid". To this end, the talent platform exchange may include a control that permits the employer to designate a particular job entry as being open for bid.

In the event that the employer has elected to have the posting "open to bid", agents may submit talent at a higher or lower placement fee percentage and have an opportunity to price their candidates. According to one aspect of the present invention, it is appreciated that this feature reverses the manner in which candidates are traditionally priced, benefiting both parties.

In the event that the employer is "not open to bid", the talent platform exchange, in one embodiment, does not allow the agent to submit a talent at a different percentage.

If the agent submits a talent under a "not open to bid" position, then the placement fee percentage may be established by the employer. In another implementation, the employer/recruiter and the agency/agent is permitted to enter a desired placement fee percentage (e.g., from a drop down menu control) in increments of 1%. For instance, the placement fee percentage may be provided within a range from 10%-35%.

According to one embodiment, recruiters/employers may be permitted to access the bidding feature on a posting confirmation page. In the case of agents/agencies, they may be permitted to view the placement fee and respond to a bid on a candidate submission page.

According to another aspect of the present invention, a conversation feature may be provided that allows the recruiter to communicate with an agent regarding a specific candidate that has been submitted within the agent's talent platform. Because, according to one embodiment, a talent platform exchange is provided that allows multiple parties to submit in place candidates, a communication system that permits various parties to contact one another may be beneficial.

In one embodiment, the conversation feature allows users to update position status and candidate status. These status changes provide the talent platform exchange with intelligent data that influences signals relative to specific users and agencies/employers. In one embodiment, the recruiter is provided access to the conversation feature by permitting the recruiter to navigate to a list of submitted candidates. In one embodiment, the actual names of the candidates may be blinded to the recruiter. This may be accomplished, for example, by not permitting the recruiter to see (e.g., by not displaying or providing) last names of candidates or any other or contact information. Once a recruiter initiates a conversation with an agent regarding a specific candidate, then the agent's contact info may be revealed by the talent platform exchange and a conversation chat may ensue between the recruiter and the candidate. To this end, the system may include a chat function and may be capable of storing identification information that allows both parties to establish a chat connection.

According to another aspect of the present invention, a capability may be provided that allows a user to enter billing information into a talent platform exchange. For example, an agent who makes the placement will be responsible to collect, input and update the billing/invoice information into a talent platform exchange form. When complete, the agent will submit the information to the talent platform exchange. If an update to placement information occurs, the talent platform exchange may be required to reissue an invoice.

According to one embodiment, one or more of the following input fields may be included on a placement form that is completed by a user (e.g., one who makes a placement).
  employer name
  invoice address, city, state zip
  invoice contact person
  invoice contact email
  invoice contact direct phone #
  purchase order # (if applicable)
  talent name
  talent start date
  talent's hiring manager name
  talent's title with employer
  talent's department with employer
  talent's location (city, state)
  talent's annual starting salary
  talent's placement fee percentage According to one embodiment, invoices generated by the talent platform exchange correspond and are designed in such a manner that reflects the partners involved in the placement. For example, the employer will be expecting an invoice from their white-labeled Talent Platform (e.g., the Kenexa Exchange powered by a talent platform exchange) and not just from an intermediary system that provides an exchange service. In addition, an agency may be expecting payment from their white labeled Talent Platform (e.g., the Bullhorn. Exchange powered by a talent platform exchange) and not just from an intermediary system that provides an exchange service.

According to another embodiment, an agent is responsible to maintain contact with the talent and the employer once a placement occurs. In one implementation, the agent validates one or more of the following responsibilities within the talent platform exchange:
  discover payment approval process
  start date
  verify placement fee (annual salary and placement fee percentage)
  verify payment terms
  verify the invoice was received by the employer
  verify employer payment status In one embodiment, the agent is responsible for inputting and updating collections-related activities and notes into the talent platform exchange. Invoice/payment status updates may include, for example:
  the date that the invoice has been sent by the talent platform exchange to an employer
  verification that the payment has been received by a talent platform exchange
  verification that the payment has cleared
  the date that the talent platform exchange is scheduled to issue payment to an agency
  the date that the talent platform exchange has sent payment to the agency In one implementation, collections customer support calls (e.g., tier 1 support) may be directed to and managed by the customer service representatives (CSRs) of a particular talent platform. In one embodiment, the talent platform exchange may provide the CSR with necessary visibility and the ability to input information into an administrative interface of the talent platform exchange. The Talent Platform CSRs may be provided an ability to communicate transaction information. In another embodiment, the talent platform exchange collections department may drive the collections process and generate any associated data (e.g., messages, letters, etc.). The Talent Platform CSR may be provide an ability to escalate an issue to the talent platform exchange collections department if the CSR is unable to resolve and document the results and/or escalation of issue within the talent platform exchange administrative interface.

Common issues that the Talent Platform CSRs will handle may include, for example:
  verify payment received by talent platform exchange from employer
  verify disbursement dates to agency
  update and/or resend invoice to employer
Notably, collections issues may be worked by talent platform personnel, while underlying collections operations are supported by the talent exchange platform.

Regarding posting visibility, in one embodiment, agents may receive employer postings through a talent platform exchange in several ways. In one implementation, recommended postings are selectively pushed to each agent as dictated by talent platform exchange signals. According to various embodiments:

recommended postings are not filtered by any criteria specified by an agent.

recommended postings are ranked and sorted by the talent platform exchange signals.

recommended postings will be truncated and grouped within the results list.

new results are pushed to agents hourly, all search postings are shown on a webpage.

In another implementation, postings may be selectively pulled from the talent platform exchange using search agents. In one implementation, an agent is provided an ability (e.g., within an interface) to create, edit and save multiple search agents within the talent platform exchange. The agents then pull any matching search results.

search postings are filtered by criteria specified by an agent.

search postings are ranked and sorted by the talent platform exchange signals.

search postings will be truncated and grouped within the results list.

new results are pushed to agents hourly.

all search postings are shown on a webpage

In one example implementation, the agent is provided the ability to review the posting results and import selected postings to their talent platform. Postings may be updated by the employer and refreshed within the posting results list. In one implementation, talent platform exchange functionality will reside and be hosted within the talent platform exchange domain as well as a partner's domain. As a result, the talent platform exchange may be accessed by users through various integration points within their talent platform.

In one implementation, a talent platform exchange requires SSL/TLS for encryption. Talent platform exchange API calls may originate from a talent platform (e.g., staffing talent platforms, hiring talent platforms). Authentication may be completed in one of the following manners:

HTTP basic/digest authentication over SSL which includes explicit account creation in the talent platform exchange. However, this does not necessarily need to involve the user.

HTTP basic authentication over SSL with a talent platform certificate on the client side.

Custom public/private key scheme where a talent platform exchange holds public key for each talent platform. In one implementation, the talent platform sends a signed user id in each request which the talent platform exchange can verify to be legitimate.

Authorization may take place at one or all of the following points—organization level authorization, per-user authorization. According to one aspect of the present invention, authorization and access control may be configured to prevent agency users from interacting to with any employer activities and vice versa. Also, in one implementation, an employer is not able to view talent's contact details until a predefined action is taken (e.g., thereby ensuring that placements get the proper credit, and the placements are processed through the talent exchange).

According to yet another aspect, a talent platform exchange may be adapted to score postings based on a variety of attributes or signals) with a defined set of weights assigned to each signal. Results of recommended postings and search postings are then sorted and displayed to a user in descending order by score. This capability allows the agent/agency or recruiter/employer to focus on the highest ranked material because they have the confidence that talent platform exchange has already done a thorough filtering of the material, and the talent exchange has determined the most appropriate postings. This capability saves time and displays the most appropriate postings or candidates in the foreground.

In one embodiment, a talent platform exchange provides appropriate and targeted job postings to an agent/agencies based on historical success and activity signals. In another implementation, the talent platform exchange provides appropriate and targeted candidate submissions for recruiters/employers based on historical success and activity signals. In yet another implementation, the talent platform exchange includes multiple signal weight sets at the same time and be able to track the success/failure of the set over the course of the search results lifecycle. The signal weight sets may be used for a set amount of time before the next generation is determined.

According to one implementation, the talent platform exchange may have one or more types of signals, such as, Intrinsic, Extrinsic, Contextual and Learned signals according to the following examples:

Intrinsic signals—in one example, intrinsic signals are calculated solely as properties of the Position Profile or the Candidate Profile.

Intrinsic Scoring for Agencies—Evaluation of Postings historical performance for filling positions salary relocation, sponsoring out of country work start date/urgency hiring party attention, ow active is the recruiter responding to submissions Intrinsic Scoring for Employers—Evaluation of Talent historical performance for generating positions/generating fees experience interview/background check keyword match of search maximum level of education of candidate versus position resume matching service keyword match of candidate skills and position Extrinsic Signals—cannot be calculated until the search is performed as the value of the signal is relative to the entity performing the search. Extrinsic scoring may be determined for an agency, employer or other entity. For instance:

Extrinsic Scoring for Agencies—evaluation of postings may be performed using one or more of the following criteria:

location competition (# of other resumes already submitted via talent platform exchange)

agent specialty prior fills w/company, similar SIC codes company prior ratios

Extrinsic Scoring for Employers—evaluation of talent may be performed using one or more of the following criteria:

location prior fills at company, similar SIC codes agent prior ratios, success rate keyword match of resume Contextual signals—a comparison of an attribute(s) of a position or a recruiter versus an attribute(s) of a candidate or an agent or a search criteria. Contextual signals may be determined for an agency, employer or other entity. For instance:

Contextual Scoring for Agencies—evaluation of postings
location of position, agent, criteria
salary desired versus salary of position
previous titles versus title of position
keyword match of search criteria "skills" and position
Contextual Scoring for Employers—evaluation of talent
location of candidate versus position versus offers relocation
seniority/years of experience of candidate versus position
previous titles versus title of position
Learned signals—may be calculated on the basis of information of both the position/profile, the agent/recruiter and agency/employer and subsequent outcomes.
Learned Scoring for Agencies—Evaluation of Postings
location
competition (# of other resumes already submitted via a talent platform exchange)
agent specialty
prior fills w/company, similar SIC codes
company prior ratios
Learned Scoring for Employers—Evaluation of Postings
location
prior fills at company, similar SIC codes
agent prior ratios, success rate
Technical Elements
Intrinsic features are normalized in advance.
Extrinsic features are calculated at search time but are normalized using mean/standard deviation process.
Signals on submission are calculated at submission time.
Signals on postings may be calculated at search time via custom elastic search function as talent platform exchange requires relevant data.

It should be appreciated that one or more signals may be used to determine the quality of postings and talent from agent/recruiter and agency/employer, and may be used to perform a matching process between them.

According to another aspect of the present invention, a talent platform exchange may include a function that provides agents with the ability to search for talent platform exchange job orders. For instance, a job order hunt function may permit a user to receive a number of recommended jobs without the need for searching, based on one or more of the signals determined above.

In one implementation, a user may be permitted to access the talent platform exchange without having to create an account and/or log in to talent platform exchange separately (e.g., through the use of an ATS). In one embodiment, an ATS system may include a control that permits a launching of a talent exchange interface through Which the user may locate and/or receive job orders. Through the interface, a user may be presented a number of navigation and searching options, in addition to being able to view performance metrics, perform accounting functions, among other options.

According to one embodiment, the user may be permitted to search for job requirements that matches manually entered data (e.g., keywords entered by a user). When the user enters a search screen, the interface may display automatically a list of recommended jobs, without the need for a search entry, based on one or more of the various signals discussed above. As words are entered by the user (e.g., staffing party) within the search form, results may be narrowed down to a filtered list. According to one embodiment, the talent platform exchange may not permit the user to create a broad search, but may restrict searching based on the capability, performance, and specialization of the particular user.

According to one implementation, a staffing party or other user type must assent to the terms and conditions before accessing search results to ensure that the user agrees to the terms and conditions of the placement. The staffing party or other user type may be permitted to save searches and import job requirements to their ATS system.

As discussed, the user may be permitted to access performance metrics regarding their placements, which can be used to evaluate placement performance. For instance, a staffing party may be permitted to access their performance metrics for a defined date range. An administrator may be provided tools to view performance of one or more users, such as accessing performance metrics of multiple users for a defined date range, accessing performance metrics of multiple departments for a defined date range, among other functions.

Further, the talent platform exchange may be capable of determining a performance score or rating for a particular user (e.g., a staffing party). In one embodiment, a staffing party may be rated based on one or more parameters, including the volume of submittals, the speed of submittals, candidate submittals that are approved versus rejected by the hiring party (e.g., by sourcing and matching). Further, a staffing party rating may be based on candidate approvals that result in placements (e.g., relationships, negotiations and the close). To accomplish this, data that determines staffing party performance may be pulled from an ATS system, and may be used alone or in combination with data stored by the talent platform exchange.

In another implementation, a staffing party is provided the capability of viewing talent platform exchange job requirements within the normal workflow for the staffing party. In one implementation, summary information for job listings may be retrieved from hiring party using an API (e.g., using XML). Such information may be updated in real time to reflect the status of particular job requisition/job requirements, and may show details that indicate whether the job has been closed or cancelled. In one implementation, the talent platform exchange provides the staffing part with the hiring party's name and the position location, but the hiring party's contact name and information is not disclosed until the hiring party expresses interest in the candidate.

In one example implementation, a staffing party is permitted to submit candidates to the talent platform exchange within a normal workflow while working within an ATS. In one embodiment, the talent platform exchange detects and rejects duplicate candidates submitted, as proper credit must be determined for a particular placement. In one embodiment, the talent platform exchange sends a system message to a submitting party if the same candidate has been submitted for the same job requirement. In another embodiment, the talent platform exchange determines message if the candidate has previously been submitted for any job requirement across the enterprise and it is less than a predefined period (e.g., 6 months) from the approval date.

In another embodiment, the talent platform exchange determines that a staffing party "owns" a particular candidate submittal, and permits the staffing party to submit the same candidate to other job requisitions. In one implementation, the candidate is considered "owned" by the staffing party for a predefined period (e.g., 6 months) from a talent platform exchange candidate approval date (e.g., a point at which the candidate record is created in the talent platform exchange).

According to one embodiment, the talent platform exchange captures data pulled from the staffing party during a candidate submittal process. The talent platform exchange may provide the hiring party with the candidate's first name at the time of submittal. In one embodiment, the talent platform exchange discloses a candidate's last name, recruiter name, recruiter company and recruiter contact information when hiring party has expressed interest in the candidate.

In one implementation, the talent platform exchange may perform several functions to ensure that candidates may be uniquely identified and tracked within the talent platform exchange system. For instance, the talent platform exchange may create a unique identifier for a particular candidate within a database. Such an identifier may also be stored, tracked and used by various systems to identify the candidate within the distributed system. The talent platform exchange may time/date stamp each candidate submittal and candidate approval and associate that candidate with the staffing party. Further, the talent platform exchange may "hard code" the talent platform exchange candidate submittals with talent platform exchange as the source of the candidate within the hiring party ATS. Further, the talent platform exchange may provide communication functions that allow feedback on candidate submittals through talent platform exchange system messages (e.g., via messages, email, etc.).

Further, hiring parties may be permitted to perform similar functions to staffing parties, such as being required to assenting to terms and conditions, observing and reporting on performance metrics, perform accounting functions, among others. For instance, with regard to performance metrics, a hiring party may review the number of open job requisitions, number of hires for a particular date range, view a statistic of the "average days to fill" which is a performance measure of job placement, among other functions. For example, "average days to fill" may be calculated with the following formula: For n closed job requisitions in a specified period, (Date requisition was closed—Date requisition was open)/n.

Hiring parties may also be permitted to calculate an average fee for a placement. For example, the average fee may be calculated using the following formula: (total fees of all placements within a period range)/(total number of placements). Hiring parties may also be able to review the history of job requisitions over particular date ranges, along with their information. For instance, a history of job requisitions may be displayed in reverse chronological order, and may be sortable, ascending and descending, by the fields in view. The history may include a name, date hired (if closed), department, title, location, compensation, tee and status.

The hiring party may be provided access to an interface that permits the hiring party to access current talent platform exchange requisitions within a current workflow. For instance, the interface my include a number of fields including requisition id, title, location, number of new candidates not yet reviewed, total candidates for requisition, among others. The hiring party may also have an interface that permits the hiring party to create a job requisition/requirement (e.g., job order). Such an interface may include one or more of the following parameters: job title, job industry, skill(s), location, company, salary and/or fee. A hiring party may also be capable of indicating, within the interface and updating within the talent platform exchange, the status of a particular candidate (e.g., by placing a particular candidate on a "not interested" list of candidates).

Regarding performance data for hiring parties (HPs), one or more of the following may be calculated and displayed by the hiring platform exchange:

Total # of HPs
    Total # of HP Users
    Total # of job requisitions (reqs) posted
    Total # of job reqs active
    Total # of job reqs active with approved candidates
    Total # of job reqs filled
    Total # of job reqs closed
    Total # of submitted candidates
    Total # of submittals reviewed by HP
    Total # of submittals approved
    Total # of submittals rejected
    Total # of placements
    Total # of starts
    Total # of starts satisfying guarantee period
    Total # of starts not satisfying guarantee period
    Total $ fees invoiced to HP
    Total $ fees paid by HP*Total $ fees owed by HP
    $ value of each job req
    $ value of each HP
    $ value of each HP user
    Avg $ placement fee for all job reqs posted
    Avg $ placement fee for all job reqs filled
    Avg days to fill Conversion data may also be calculated and determined for a hiring party. One or more of the following may be determined and displayed by the hiring platform exchange:

submittals per job requisition
    candidates approved per job requisition
    placements per job requisition Further, one or more of the following data elements may be tracked and maintained for staffing parties, including:

Total it of staffing parties SPs)
    Total # of SP Users
    Total # of job reqs submitted to
    Total # of submitted candidates
    Total # of submittals approved
    Total # of submittals rejected
    Total # of starts
    Total # of starts satisfying guarantee period
    Total # of starts not satisfying guarantee period
    Total $ fees invoiced by SP
    Total $ fees paid to SP
    Total $ fees owed to SP
    Total $ potential fees currently offered
    $ value of each job submittal
    $ value of each approved submittal
    $ value of each SP user
    Avg $ fee per placement
    Avg days to fill Conversion data may also be calculated and determined for a staffing party. One or more of the following may be determined and displayed by the hiring platform exchange:

Candi date submittal to HP acceptance
    Candidate acceptance to placement
    Candidate submittal to placement According to another aspect of the present invention, a "talent platform exchange marketplace" may be provided that allows the ability for an agent and a recruiter to negotiate the fee for a placement project. Workflow for the marketplace may include, for example:

An HP recruiter submits a job, specifies the percentage fee for the job
    The fee is a number (e.g., with a floor value of 15%)
    The job can be marked as "open for bid" or not [0361] A Staffing Party agent can submit a candidate to a job If the job is marked as "open for bid," the SP agent can choose to include in addition to the candidate information, a proposed fee, also subject to the original fee (e.g., minimum 15%, precision)
    The proposed fee can also be omitted, defaulting to the proposed fee of the original job
The HP recruiter reviews the submitted candidate
If interested, the submission data is unblended
If the HP recruiter is not interested
    HP recruiter can indicate the reason for the negative review. candidate not qualified? fee too high? both?
    a negative review prevents the agent from submitting the candidate again this job
Recruiter modifies an already submitted job
    The modification can include the fee, but perhaps other attributes such as experience, or other parameter
    SP agents with an existing submission are notified that the job has been modified, to give them a chance to potentially rescind/modify their submission
    SP agents whose candidate submissions have been rejected (reviewed "not interested") are allowed to submit the candidate again
This is just one of many use cases that show how a particular workflow between a hiring party and staffing party.

Computer System

As discussed above with regard to FIGS. 1A and 2, various aspects and functions may be implemented as specialized hardware or software components executing in one or more computer systems. There are many examples of computer systems that are currently in use that may be suitable for implementing various aspects of the present invention. These examples include, among others, network appliances, personal computers, workstations, mainframes, networked clients, servers, virtual computer systems, cloud-based computer systems, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 16:
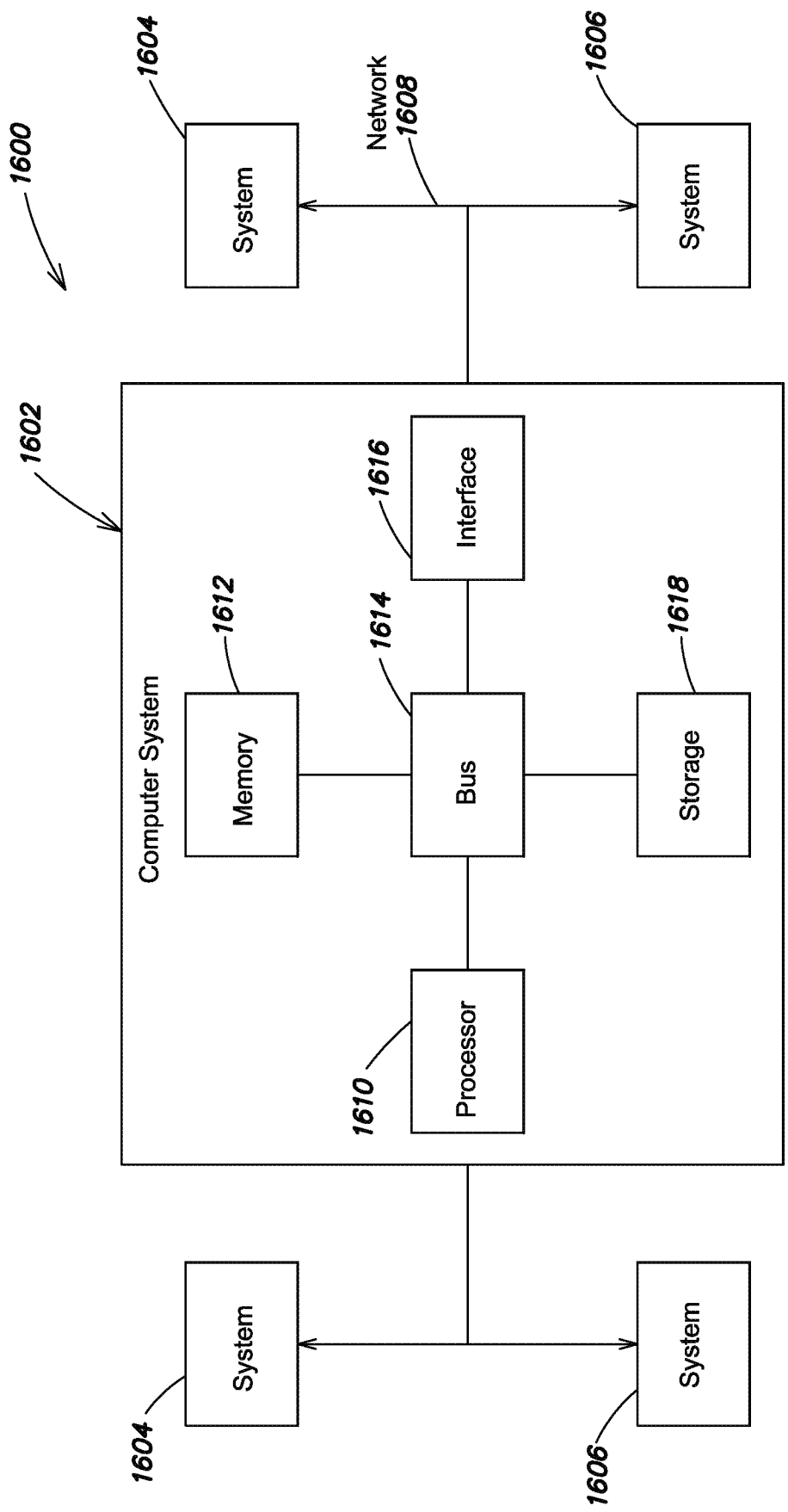
FIG. 16 is a block diagram of one example of a computer system that may be used to perform processes and functions disclosed herein.

Referring to FIG. 16, there is illustrated a block diagram of a distributed computer system 1600, in which various aspects and functions may be practiced. The distributed computer system 1600 may include one more computer systems that exchange (i.e. send or receive) information. For example, as illustrated, the distributed computer system 1600 includes computer systems 1602, 1604 and 1606. As shown, the computer systems 1602, 1604 and 1606 are interconnected by, and may exchange data through, a communication network 1608. The network 1608 may include any communication network through which computer systems may exchange data. To exchange data using the network 1608, the computer systems 1602, 1604 and 1606 and the network 1608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS. MMS, SS7, JSON, SOAP, CORBA, REST and Web Services. To ensure data transfer is secure, the computer systems 1602, 1604 and 1606 may transmit data via the network 1608 using a variety of security measures including, for example, TLS, SSL or VPN. While the distributed computer system 1600 illustrates three networked computer systems, the distributed computer system 1600 is not so limited and may include any number of computer systems and computing devices, networked using any medium and communication protocol.

FIG. 16 illustrates a particular example of a distributed computer system 1600 that includes computer system 1602, 1604 and 1606, As illustrated in FIG. 16, the computer system 1602 includes a processor 1610, a memory 1612, a bus 1614, an interface 1616 and data storage 1618. The processor 1610 may perform a series of instructions that result in manipulated data. The processor 1610 may be a commercially available processor such as an Intel Xeon, Itanium, Core, Celeron, Pentium, AMD Opteron, Sun Ultra-SPARC, IBM Power5+, or IBM mainframe chip, but may be any type of processor, multiprocessor or controller. The processor 1610 is connected to other system components, including one or more memory devices 1612, by the bus 1614.

The memory 1612 may be used for storing programs and data during operation of the computer system 1602. Thus, the memory 1612 may be a relatively high performance, volatile, random access memory such as a dynamic random access memory (DRAM) or static memory (SRAM). However, the memory 1612 may include any device for storing data, such as a disk drive or other non-volatile storage device. Various examples may organize the memory 1612 into particularized and, in some cases, unique structures to perform the functions disclosed herein and these data structures may be tailored to store values for particular types of data.

Components of the computer system 1602 may be coupled by an interconnection element such as the bus 1614. The bus 1614 may include one or more physical busses, for example, busses between components that are integrated within a same machine, but may include any communication coupling between system elements including specialized or standard computing bus technologies such as IDE, SCSI, PCI and InfiniBand. Thus, the bus 1614 enables communications, such as data and instructions, to be exchanged between system components of the computer system 1602.

The computer system 1602 also includes one or more interface devices 1616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1602 to exchange information and communicate with external entities, such as users and other systems.

The data storage 1618 may include a computer readable and writeable nonvolatile (non-transitory) data storage medium in which instructions are stored that define a program or other object that may be executed by the processor 1610. The data storage 1618 also may include information that is recorded, on or in, the medium, and this information may be processed by the processor 1610 during execution of the program. More specifically, the information may be stored in one or more data structures specifically configured to conserve storage space or increase data exchange performance. The instructions may be persistently stored as encoded signals, and the instructions may cause the processor 1610 to perform any of the functions described herein. The medium may, for example, be optical disk, magnetic disk or flash memory, among others. In operation, the processor 1610 or some other controller may cause data to be read from the nonvolatile recording medium into another memory, such as the memory 1612, that allows for faster access to the information by the processor 1610 than does the storage medium included in the data storage 1618. The memory may be located in the data storage 1618 or in the memory 1612, however, the processor 1610 may manipulate the data within the memory 1612, and then copy the data to the storage medium associated with the data storage 1618 after processing is completed. A variety of components may manage data movement between the storage medium and other memory elements and examples are not limited to particular data management components. Further, examples are not limited to a particular memory system or data storage system.

Although the computer system 1602 is shown by way of example as one type of computer system upon which various aspects and functions may be practiced, aspects and functions are not limited to being implemented on the computer system 1602 as shown in FIG. 16. Various aspects and functions may be practiced on one or more computers having a different architectures or components than that shown in FIG. 16. For instance, the computer system 1602 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1602 may be a computer system including an operating system that manages at least a portion of the hardware elements included in the computer system 1602. In some examples, a processor or controller, such as the processor 1610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 1610 and operating system together define a computer platform for which Its application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

According to one embodiment, a talent platform exchange may be implemented using a distributed computer system. For instance, various distributed components may be used to implement certain aspects of the system. In one implementation, the well-known Amazon Web Services may be used to implement various web service components. Such services may use the well-known Elastic. Cloud Computing (EC2) services, Simple Storage Service (S3), Elastic Load Balancer, and Route 53 DNS services also provided by Amazon. VPN services may be employed for secure access to the talent platform exchange, by using, for example, Cohesive's FT VPN Cubed to create a virtual private network. The 10 gen MongoDB database may be used to store talent platform exchange data. However, it should be appreciated that other platform types may be used to perform various functions of a talent platform exchange according to various aspects of the present invention.

Having thus described several aspects of the present invention, it is to be appreciated that various alterations, modifications, and improvements will readily occur to those skilled in the ark. Such alterations, modifications, and improvements are intended to be part of this disclosure, and are intended to be within the scope of the examples discussed herein. Accordingly, the foregoing description and drawings are by way of example only.

What is claimed is:

1. A system for integrating disparate talent platforms, the system comprising:
   a processor;
   a data store;
   a first API configured to communicate with a hiring talent platform, the hiring talent platform associated with a hiring party;
   a second API configured to communicate with a staffing talent platform separate from the hiring talent platform, the staffing talent platform associated with a staffing party;
   wherein the processor is configured to:
      access, from the hiring talent platform via the first API, a record of a job order when the job order is submitted in the hiring talent platform;
      cause the staffing talent platform to display information from the record of the job order in a user interface of the staffing talent platform;
      access, from the staffing talent platform via the second API, a submission of a candidate to the job order when the candidate is submitted to the job order in the staffing talent platform;
      access, from the hiring talent platform via the first API, an indication that the hiring party has placed the candidate to the job order; and
      responsive to accessing the indication that the hiring party has placed the candidate to the job order, cause the staffing talent platform to display information indicating that the candidate has been placed to the job order in the user interface of the staffing talent platform.

2. The system of claim 1, wherein the processor is configured to:
   store a record of the candidate in the data store; and
   include a status of the candidate in relation to the job order in the record of the candidate.

3. The system of claim 2, wherein the processor is configured to:
   detect a change in hiring stage of the candidate performed in the hiring talent platform; and
   update the record by changing the status of the candidate based on the detected change in hiring stage of the candidate.

4. The system of claim 3, wherein the processor is configured to:
   cause the staffing talent platform to display an indication of the status of the candidate in the user interface of the staffing talent platform; and
   cause the staffing talent platform to update the displayed indication of the status of the candidate in the user interface of the staffing talent platform in response to changing the status of the candidate.

5. The system of claim 1, wherein the processor is configured to:
   responsive to accessing the submission of the candidate to the job order, cause the hiring talent platform to display a first set of information about the candidate in a user interface of the hiring talent platform.

6. The system of claim 5, wherein the processor is configured to:
   access, from the hiring talent platform via the first API, an indication that the hiring party is interested in the candidate; and
   responsive to accessing the indication that the hiring party is interested in the candidate, cause the hiring talent platform to display a second set of information about the candidate in the user interface of the hiring talent platform, wherein the first set of information does not include at least a portion of the second set of information.

7. The system of claim 1, wherein the processor is configured to:
   generate an interface in a user interface of the hiring talent platform, the interface configured to receive submissions of job orders; and
   access the record of the job order when the job order is submitted via the interface in the user interface of the hiring talent platform.

8. The system of claim 1, wherein the processor is configured to:
   generate an interface in the user interface of the staffing talent platform, the interface configured to receive submissions of candidates; and
   access the submission of the candidate when the candidate is submitted via the interface in the user interface of the staffing talent platform.

9. The system of claim 1, wherein the hiring talent platform comprises a first applicant tracking software (ATS) application and the staffing talent platform comprises a second ATS application different from the first ATS application.

10. A system for integration disparate talent platforms, the system comprising:
    a processor;
    a data store;
    a first API configured to communicate with hiring talent platforms associated with respective hiring parties;
    a second API configured to communicate with a staffing talent platform separate from the hiring talent platforms, the staffing talent platform associated with a staffing party;
    wherein the processor is configured to:
       access, via the first API from at least one of the hiring talent platforms, records of a plurality of job orders when the plurality of job orders are submitted via the at least one hiring talent platform;
       filter the plurality of job orders for the staffing party associated with the talent platform;
       cause the first staffing talent platform to display information from records of the filtered set of job orders in a user interface of the staffing talent platform;
       access, from the staffing talent platform via the second API, a submission of a candidate to a first one of the filtered set of job orders, the first job order submitted in a first one of the hiring talent platforms;
       responsive to accessing the submission of the candidate to the first job order, cause the first hiring talent platform to display information about the candidate in a user interface of the first hiring talent platform.

11. The system of claim 10, wherein the processor is configured to:
    determine a score for each of at least some of the plurality of job orders in relation to the staffing party; and
    filter the plurality of job orders using scores determined for the at least some job orders.

12. The system of claim 11, wherein the processor is configured to, for each of the at least some job orders:
    compare a location associated with the job order to one or more locations that the hiring party has previously placed candidates in; and
    determine a score for the job order based on the comparison.

13. The system of claim 11, wherein the processor is configured to, for each of the at least some job orders:
  determine a number of candidate submissions to the job order; and
  determine a score for the job order based on the number of candidate submissions.

14. The system of claim 11, wherein the processor is configured to, for each of the at least some job orders:
  compare a specialty of the staffing party to a specialty associated with the job order; and
  determine a score for the job order based on the comparison.

15. The system of claim 11, wherein the processor is configured to:
  access, from the first hiring talent platform via the first API, an indication that a first hiring party has placed the candidate to the first job order; and
  responsive to accessing the indication that the first hiring party has placed the candidate to the first job order, cause the staffing talent platform to display information indicating that the candidate has been placed to the first job order in a user interface of the staffing talent platform.

16. A system for integrating disparate talent platforms, the system comprising:
  a data store;
  a processor;
  a first application programming interface (API) configured to communicate with a hiring talent platform, the hiring talent platform being associated with a hiring party;
  a second API configured to communicate with a plurality of staffing talent platforms separate from the hiring talent platform, the plurality of staffing talent platforms being associated with respective staffing parties;
  wherein the processor is configured to:
    access, from the hiring talent platform via the first API, a record of a job order when the job order is submitted in the hiring talent platform;
    access, from at least one of the plurality of staffing talent platforms via the second API, records of a plurality of candidates when the plurality of candidates are submitted in the at least one staffing talent platform;
    identify a candidate of the plurality of candidates to recommend for the job order based on the record of the job order and a record of the candidate, wherein the candidate is accessed from a first one of the at least one staffing talent platform associated with a first staffing party; and
    responsive to identifying the candidate to recommend for the job order, cause the first staffing platform to display information about the job order in a user interface of the first staffing talent platform.

17. The system of claim 16, wherein the processor is configured to:
  determine a score for each of at least some of the plurality of candidates in relation to the job order; and
  identify the candidate to recommend for the job order based on scores determined for the at least some candidates.

18. The system of claim 17, wherein the processor is configured to, for each of the at least some candidates:
  compare a location of the candidate to a location associated with the job order; and
  determine a score for the candidate based on the comparison.

19. The system of claim 17, wherein the processor is configured to, for each of the at least some candidates:
  compare previous titles of the candidate to a title associated with the job order; and
  determine a score for the candidate based on the comparison.

20. The system of claim 17, wherein the processor is configured to, for each of the at least some candidates:
  compare a number of years of experience of the candidate to a number of years of experience associated with the job order; and
  determine a score for the candidate based on the comparison.

* * * * *